United States Patent
Hwang et al.

(10) Patent No.: US 10,427,594 B2
(45) Date of Patent: Oct. 1, 2019

(54) DECELERATION ALERT DEVICE AND METHOD

(71) Applicant: J-MEX Inc., Hsinchu (TW)

(72) Inventors: Deng-Huei Hwang, Hsinchu (TW); Chi-Hung Chen, Hsinchu (TW); Shang-Po Yeh, Hsinchu (TW)

(73) Assignee: J-MEX, Inc., Science Park, Hsinchu (TW)

( * ) Notice: Subject to any disclaimer, the term of this patent is extended or adjusted under 35 U.S.C. 154(b) by 0 days.

(21) Appl. No.: 15/922,733

(22) Filed: Mar. 15, 2018

(65) Prior Publication Data

US 2018/0334091 A1 Nov. 22, 2018

(30) Foreign Application Priority Data

May 18, 2017 (TW) .............................. 106116520 A

(51) Int. Cl.
| | |
|---|---|
| *B60Q 1/50* | (2006.01) |
| *B60Q 1/44* | (2006.01) |
| *B62J 6/04* | (2006.01) |
| *B62J 6/16* | (2006.01) |
| *B62J 27/00* | (2006.01) |
| *B62L 3/02* | (2006.01) |
| *B62J 99/00* | (2009.01) |

(52) U.S. Cl.
CPC ............. *B60Q 1/447* (2013.01); *B62J 6/04* (2013.01); *B62J 6/16* (2013.01); *B62J 27/00* (2013.01); *B62J 2099/002* (2013.01); *B62K 2207/00* (2013.01); *B62L 3/02* (2013.01)

(58) Field of Classification Search
CPC ................................. B60Q 1/447; B62J 6/04
USPC .......................................................... 340/467
See application file for complete search history.

(56) References Cited

U.S. PATENT DOCUMENTS

| | | | | |
|---|---|---|---|---|
| 5,579,230 A | * | 11/1996 | Lin | ......................... B60T 8/172 |
| | | | | 180/197 |
| 7,649,447 B2 | | 1/2010 | Lu | |
| 8,717,155 B2 | | 5/2014 | Lin | |
| 8,949,070 B1 | * | 2/2015 | Kahn | ................... G01C 22/006 |
| | | | | 702/141 |
| 2004/0032324 A1 | | 2/2004 | Otani | |
| 2007/0219692 A1 | * | 9/2007 | Kuhn | .................. B60R 21/0132 |
| | | | | 701/45 |

(Continued)

*Primary Examiner* — Naomi J Small
(74) *Attorney, Agent, or Firm* — Chen Huang; Adli Law Group P.C.

(57) ABSTRACT

An alert device for a moving device having a variable acceleration includes a sensing unit and a processor. The sensing unit senses the variable acceleration to generate a plurality of acceleration data. The processor determines a first plurality of acceleration data samples and a second plurality of acceleration data samples from the plurality of acceleration data based on two different predetermined sample sizes and a moving average algorithm to correspondingly calculate a first plurality of sample averages and a second plurality of sample averages, obtains a plurality of sample average differences between the first and the second pluralities of sample averages, analyzes the plurality of sample average differences based on a predetermined check algorithm to obtain a derived resultant value, and performs a data comparison between the derived resultant value and a predetermined threshold value to generate a comparison result.

20 Claims, 20 Drawing Sheets

(56) References Cited

U.S. PATENT DOCUMENTS

| | | | |
|---|---|---|---|
| 2009/0247216 A1* | 10/2009 | Kamatani | H04M 1/72519 455/550.1 |
| 2011/0130932 A1* | 6/2011 | Takenaka | F16H 63/50 701/58 |
| 2011/0205177 A1* | 8/2011 | Nakai | G06F 1/1694 345/173 |
| 2015/0316579 A1* | 11/2015 | Pakzad | G01P 15/02 702/150 |
| 2018/0267074 A1* | 9/2018 | Keal | G01P 21/00 |

* cited by examiner

DECELERATION ALERT DEVICE AND METHOD

CROSS-REFERENCE TO RELATED APPLICATION AND CLAIM OF PRIORITY

The application claims the benefit of Taiwan Patent Application No. 106116520, filed on May 18, 2017, at the Taiwan Intellectual Property Office, the disclosures of which are incorporated herein in their entirety by reference.

TECHNICAL FIELD

The present disclosure is related to an alert device and, more particularly, is related to a deceleration alert device and method for a moving device.

BACKGROUND

Today, people are increasingly aware of the importance of environmental protection. Energy saving is especially necessary to help the environment which, in turn, helps the quality of life. The focus on low carbon emission during daily traffic use is especially important for the health of the public in carbon areas. In view of this, a bicycle serves as a useful tool for reducing the carbon footprint while being used for activities including short-distance commuting, leisure journeys, physical exercise, and so forth.

In a prior-art technique, an alert device for alerting a speed change of a bicycle includes an accelerometer and a brake light. The alert device detects a predetermined deceleration condition of the bicycle by using the accelerometer to turn on the brake light.

U.S. Pat. No. 7,649,447 B2 discloses a wireless bike brake light. U.S. Pat. No. 8,717,155 B2 discloses a brake warning device and method. U.S. Patent Publication No. 2004/0032324 A1 discloses a brake light controller. In general, it is necessary for a brake warning device to perform a low-pass filtering operation in the disclosures in the prior art. Although the low-pass filtering operation can eliminate a relatively-high frequency vibration noise, it can also influence or filter out another acceleration signal that is necessary for lighting up an alerting device.

SUMMARY OF EXEMPLARY EMBODIMENTS

Because a friendly environment created by bicycles is beneficial to public health, people widely use bicycles. A bicycle rider has to pay attention to a number of safety issues, so creating an efficient deceleration alert for a bicycle is a potentially important development in the field.

Today, there are safety lights sold on the market. In general, the safety light can be installed on a seat post. In fact, the rear safety light has several light emitting modes (such as a constant light emitting mode and a flicker/blinking light emitting mode). No matter which light emitting mode is selected, the safety light is unable to interact with a deceleration motion of a bicycle to change the light emitting mode to alert another vehicle, person or mobile carrier following behind. In this way, a brake deceleration motion of the bicycle incurs a very high risk that the travelling bicycle might has a rear-end collide with the following vehicle, especially in dim light conditions.

In order to equip with this brake deceleration detection function for the existing safety rear light, a feasible way is to use a micro-electro-mechanical system (MEMS) gravity sensor or a MEMS acceleration sensor having a very small volume for the safety rear light. The gravity sensor is used to detect an acceleration/deceleration associated with the speed variation to generate a relevant signal due to a brake operation of the travelling vehicle, wherein the relevant signal is used to turn on the rear safety light to send out a light emitting pattern corresponding to the deceleration motion.

It is one aspect of the present disclosure to provide an alert device. The alert device performs a quasi-band-pass filtering function to process an acceleration signal of a moving device, and thus effectively extracts a brake deceleration signal from the acceleration signal to send out an alert.

It is therefore one embodiment of the present disclosure to provide an alert device for a moving device having a variable acceleration. The alert device includes a sensing unit, a data processing unit and a motion analysis unit. The sensing unit includes an accelerometer, and senses the variable acceleration to generate a plurality of acceleration data. The data processing unit employs a moving average algorithm, determines a first plurality of acceleration data samples and a second plurality of acceleration data samples respectively corresponding to two different predetermined sample sizes from the plurality of acceleration data based on the moving average algorithm to correspondingly calculate a first plurality of sample averages and a second plurality of sample averages, and obtains a plurality of sample average differences between the first and the second pluralities of sample averages. The motion analysis unit analyzes the plurality of sample average differences based on a predetermined check algorithm to obtain a derived resultant value, and performs a data comparison between the derived resultant value and a predetermined threshold value to generate a comparison result.

It is therefore another embodiment of the present disclosure to provide an alert method for a moving device having a motion. The alert method includes the following steps. A moving average algorithm is provided. A plurality of acceleration data is obtained by sensing the motion. Based on two different predetermined sample sizes and the moving average algorithm, a first plurality of acceleration data samples and a second plurality of acceleration data samples respectively corresponding to the two different predetermined sample sizes are determined from the plurality of acceleration data to correspondingly calculate a first plurality of sample averages and a second plurality of sample averages. A plurality of sample average differences between the first and the second pluralities of sample averages are obtained. The plurality of sample average differences are analyzed based on a predetermined check algorithm to obtain a derived resultant value. A data comparison between the derived resultant value and a predetermined threshold value is performed to generate a comparison result.

It is therefore still another embodiment of the present disclosure to provide an alert method for a moving device having a motion. The alert method includes the following steps. A moving average algorithm is provided. A plurality of motion data having a first plurality of data contents and a second plurality of data contents is generated in response to the motion. A first predetermined data frame and a second predetermined data frame respectively associated with the first and the second plurality of data contents are selected. Based on the first and the second predetermined data frames and the moving average algorithm, a first plurality of motion data samples and a second plurality of motion data samples respectively corresponding to the first and the second predetermined data frames are selected from the plurality of motion data to correspondingly calculate a first plurality of sample averages and a second plurality of sample averages. A plurality of sample average differences between the first and the second pluralities of sample averages are analyzed to obtain an analysis result.

BRIEF DESCRIPTION OF THE DRAWINGS

The foregoing and other features and advantages of the present disclosure will be more clearly understood through the following descriptions with reference to the drawings, wherein.

DETAIL DESCRIPTION OF THE PREFERRED EMBODIMENTS

The present disclosure will now be described more specifically with reference to the following embodiments. It is to be noted that the following descriptions of preferred embodiments of this disclosure are presented herein for the purposes of illustration and description only; they are not intended to be exhaustive or to be limited to the precise form disclosed.

Figure 1:
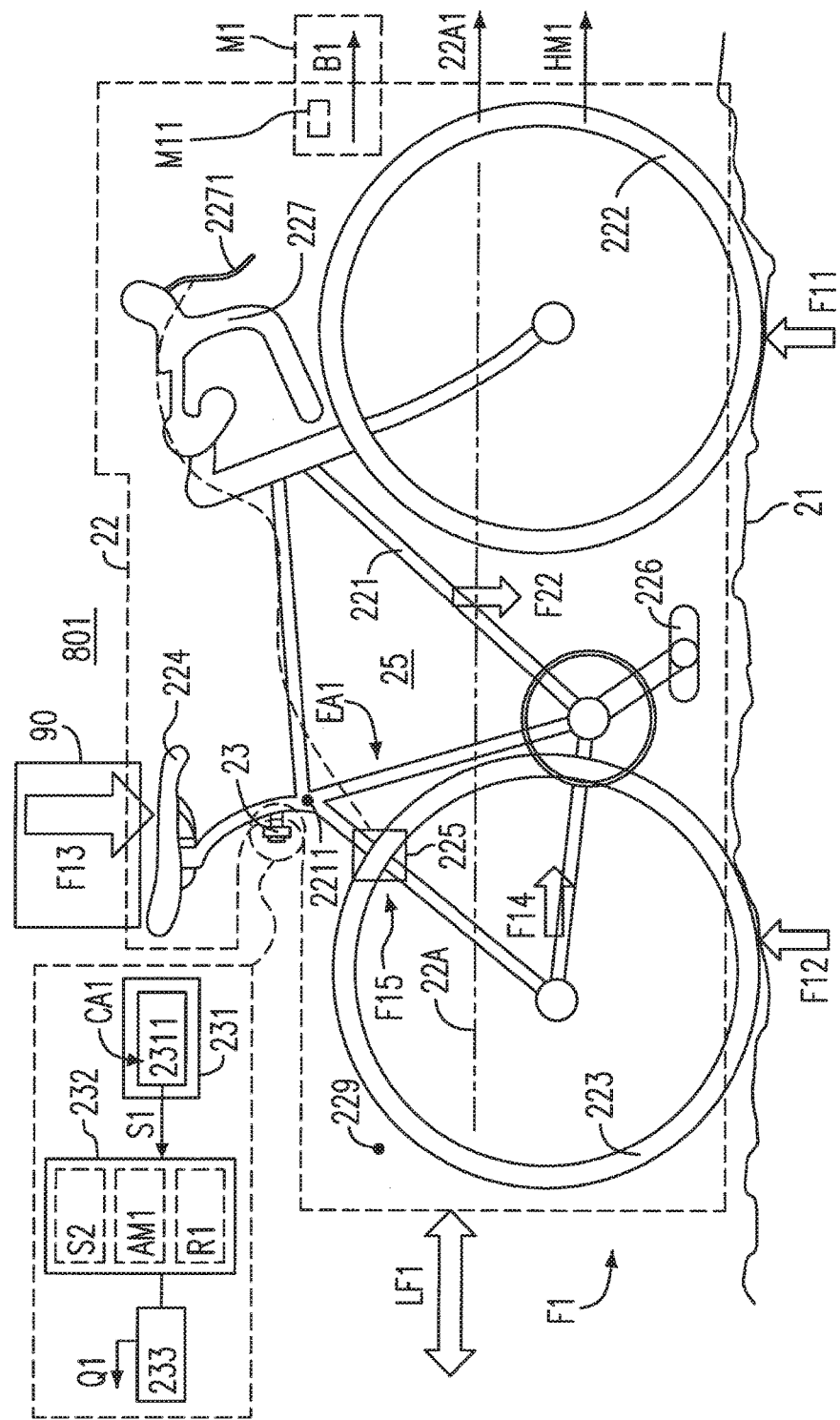
FIG. 1 is a schematic diagram showing a motion system according to various embodiments of the present disclosure.
Figure 2A:
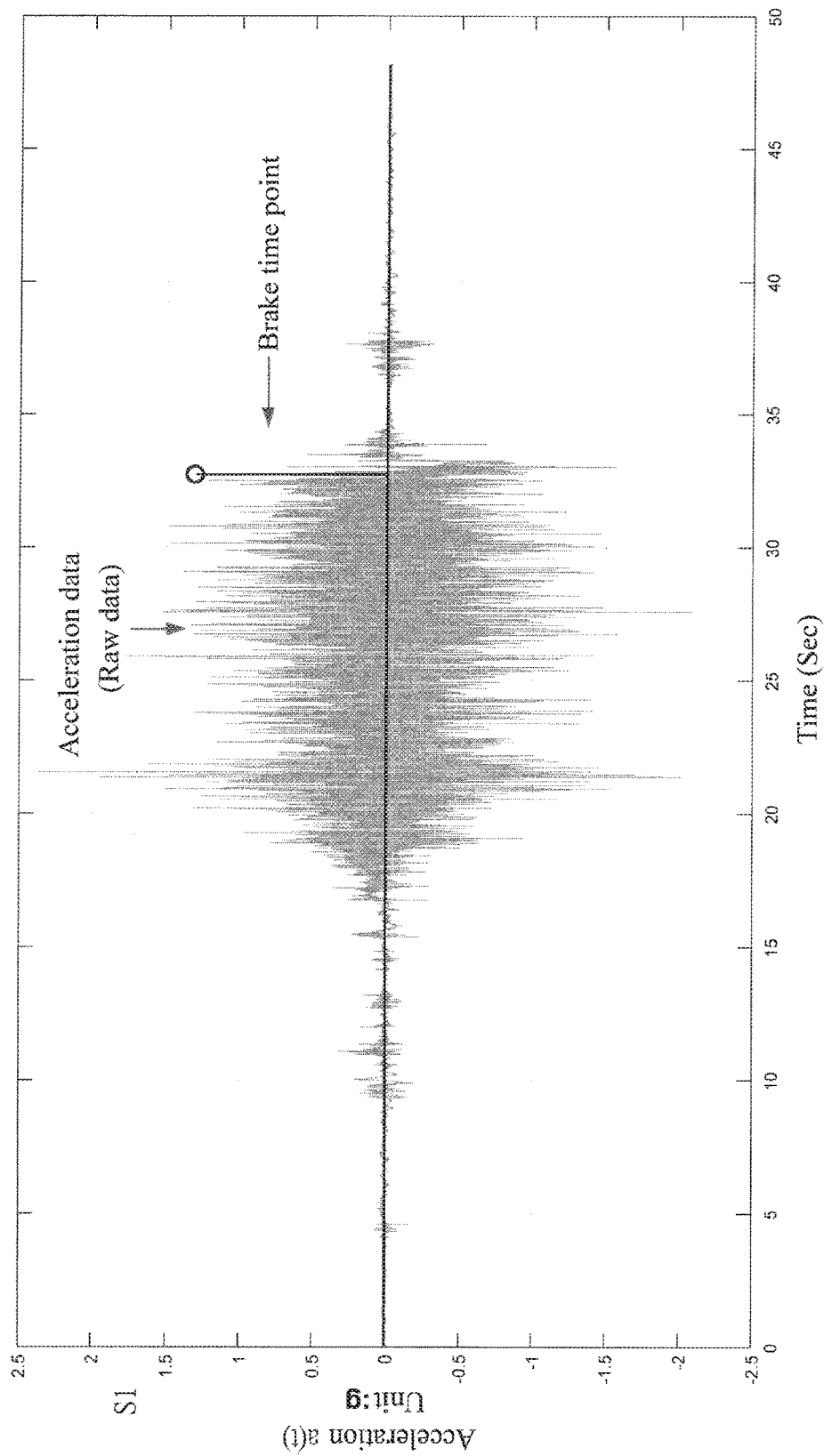
FIG. 2A is an acceleration variation diagram showing an acceleration sense signal of an acceleration associated with a moving device.
Figure 2B:
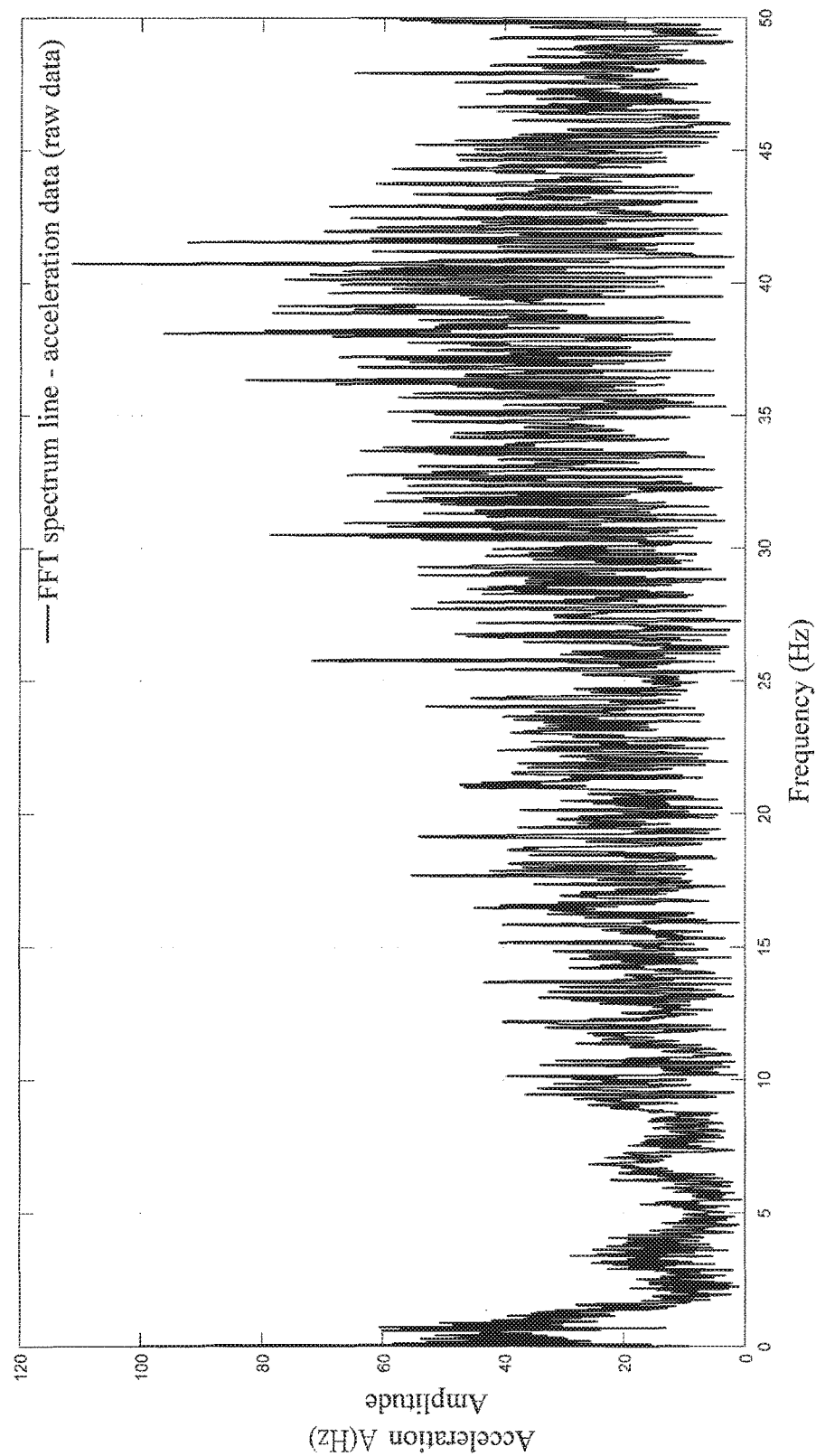
FIG. 2B is a relation diagram showing an estimated acceleration configured to correspond to the acceleration sense signal and changing according to a frequency.

Please refer to FIG. 1, FIG. 2A and FIG. 2B. FIG. 1 is a schematic diagram showing a motion system 801 according to various embodiments of the present disclosure. FIG. 2A is an acceleration variation diagram showing an acceleration sense signal S1 of an acceleration a(t) associated with a moving device 22. FIG. 2B is a relation diagram showing an estimated acceleration A(Hz) configured to correspond to the acceleration sense signal S1 changing according to a frequency. When the moving device 22 travels with a variable acceleration B1 in a moving reference direction 22A1 on an asphalt road surface, the variable acceleration B1 is sensed to obtain the acceleration sense signal S1. The acceleration variation diagram expressed in the time domain as shown in FIG. 2A, by using a fast Fourier transform, is transformed into a frequency spectrum diagram, expressed in the frequency domain, of a physical quantity associated with an acceleration. For instance, the frequency spectrum diagram is a displacement spectrum diagram or a power spectrum diagram.

The motion system 801 includes a road surface 21, the moving device 22 moving on the road surface 21, and an alert device 23 coupled to the moving device 22. For instance, the moving device 22 is a vehicle. For instance, the vehicle is a bicycle 25. The moving device 22 has a moving reference axis 22A. The alert device 23 is disposed on the moving device 22 based on the moving reference axis 22A. The moving reference axis 22A has the moving reference direction 22A1.

In some embodiments, the moving device 22 includes a device body 221, a front wheel 222, a rear wheel 223, a seat 224, a brake unit 225, a driving structure 226 and a handling unit 227. Each of the alert device 23, the front wheel 222, the rear wheel 223, the seat 224, the brake unit 225, the driving structure 226 and the handling unit 227 is coupled to the device body 221. The handling unit 227 is configured to control the front wheel 222 and the brake unit 225. For instance, the driving structure 226 is a pedal structure. For instance, the moving device 22 includes a first rear portion 229; and the alert device 23 is disposed on the first rear portion 229 based on the moving reference axis 22A. For instance, the device body 221 includes a second rear portion 2211; and the alert device 23 is disposed on the second rear portion 2211 based on the moving reference axis 22A.

In some embodiments, the alert device 23 for the moving device 22 having the variable acceleration B1 includes a sensing unit 231, a processor 232 coupled to the sensing unit 231, and an alert unit 233 coupled to the processor 232. The sensing unit 231 includes an accelerometer 2311, and senses the variable acceleration B1 to generate an acceleration sense signal S1 by using the accelerometer 2311. The processor 232, based on the acceleration sense signal S1, decides whether to cause the alert unit 233 to output an alert signal Q1; that is, the processor 232 makes a decision R1 based on the acceleration sense signal S1. When the decision R1 is positive, the processor 232 causes the alert unit 233 to output the alert signal Q1.

For instance, the moving device 22 does a motion M1 having the variable acceleration B1. The road surface 21 is the asphalt road surface, and the motion M1 is a travelling motion. For instance, the motion M1 is characterized by the variable acceleration B1; and the variable acceleration B1 is represented by the acceleration sense signal S1. For instance, the accelerometer 2311 is configured to have a body coordinate system, and an X-axis sensing direction, a Y-axis sensing direction and a Z-axis sensing direction associated with the body coordinate system. The X-axis sensing direction is configured to be the same as or parallel to the moving reference direction 22A1, and is configured to be in a travelling direction HM1 of the moving device 22. For instance, the acceleration sense signal S1 is configured to represent an acceleration in the travelling direction HM1, and is expressed by a sense data.

The moving device 22 is used by a user 90, and receives an applied force structure F1 to do the motion M1. The applied force structure F1 includes a first reaction force F11 applied to the front wheel 222 by the road surface 21, and a second reaction force F12 applied to the rear wheel 223 by the road surface 21. The user 90 has a user weight F13. The applied force structure F1 may further include the user weight F13 applied to the seat 224 by the user 90, a driving force F14 transmitted by the driving structure 226, and a braking force F15 applied by the brake unit 225. For instance, the handling unit 227 includes a brake handling component 2271 coupled to the brake unit 225; and the user 90 handles the brake handling component 2271 to perform a brake operation EA1 to cause the motion M1 to include a deceleration motion M11. For instance, the brake operation EA1 includes operation portions of causing the brake unit 225 to apply the braking force F15, and causing the variable acceleration B1 to have a deceleration value. For instance, the user 90 applies the driving force F14 to the pedal structure to cause the pedal structure to transmit the driving force F14.

When the moving device 22 moves on a horizontal plane, the moving reference axis 22A is parallel to the horizontal plane. As depicted in FIG. 1, the road surface 21 fluctuates irregularly. The moving device 22 has a device weight F22. When an inclination angle of the road surface 21 changes or the road surface 21 fluctuates along a road, the fluctuated inclination angle of the road surface 21 with respect to the horizontal plane can cause the moving device 22, travelling on the road surface 21, and the ideal horizontal plane to have an included angle therebetween. The gravity ideally acts in a direction vertical to the horizontal plane, and the sensing unit 231 included in the alert device 23 is installed on the moving device 22. This included angle can cause the accelerometer 2311 included in the sensing unit 231 to sense a gravity component of the gravity to form a gravity bias or an acceleration bias LF1. In some embodiments, the accelerometer 2311 senses the motion M1 at a predetermined sampling frequency CA1 to generate the acceleration sense signal S1. For instance, the predetermined sampling frequency CA1 is 200 Hz.

As shown in FIG. 2A, the acceleration sense signal S1 is inundated with a noise, so that it is difficult to make the decision R1. It is necessary to improve the intrinsic drawback that the acceleration sense signal S1 generated by the accelerometer 2311 has a noise with a variety of frequencies, wherein the noise with a variety of frequencies is formed due to different motion environments, different operations or different signal acquisition mechanisms.

In general, an application idea is relatively intuitive in that the accelerometer 2311 is used to sense the deceleration of the bicycle 25 to cause the alert unit 233 to start to emit a deceleration alert light when the bicycle 25 is travelling, wherein the alert unit 233 is an alert light. However, due to an intrinsically dynamic sensing property of a relatively wide frequency band, the accelerometer 2311 can inevitably sense an environment noise, especially a vibration signal, when sensing an acceleration/deceleration of a carrier or a vehicle. Such vibration noise can seriously influence the sensed deceleration signal of the vehicle, and thus must be definitely identified. In some embodiments, a low-pass filtering is used to eliminate the influence of this relatively-high frequency vibration noise. For instance, a low-pass filter implemented by a hardware form is used to perform the low-pass filtering. Or, a low-pass filter implemented by a software form is used to perform the low-pass filtering by using an operation method (such as a moving average algorithm AM1).

In an embodiment in the aforementioned prior art, the processor 232 performs a low-pass filtering to the acceleration sense signal S1 to generate a result signal S2, and makes the decision R1 based on the result signal S2 to cause the alert unit 233 to send out the alert signal Q1. However, only employing the low-pass filtering may make the filtering frequency bandwidth to be too wide or too narrow. Although the low-pass filtering may eliminate the influence of the relatively-high frequency vibration noise, a selected filtering frequency bandwidth can influence or filter out a definitely acceleration signal. After all, a different vibration noise can have a different physical meaning.

In addition to the concerned motion acceleration/deceleration, the bicycle 25 can further receive additional motion signals (or waves) when travelling. Under most conditions, these additional motion signals (or waves) include a periodic acceleration-and-deceleration signal, a shake signal, a periodic vibration signal, a random vibration signal without a specific period, or a pulse signal. These vibration signals having a form similar to an alternating current can seriously influence an identification distinguishing a brake deceleration signal having a characterization of a direct current or a single acceleration/deceleration direction; here, each one of the periodic acceleration-and-deceleration signal, the shake signal, the vibration signal (or wave), or the pulse signal is tentatively called as a noise. In general, the sources of the shake signal or the vibration signal are relevant to the environment of the road surface 21 and the dynamic operation of the bicycle 25.

The accelerometer 2311 can intrinsically cause the acceleration sense signal S1 to include an intrinsic noise. For instance, the intrinsic noise includes an intrinsic bias and a drifting noise. The intrinsic bias for the back-and-forth (or periodic) acceleration-and-deceleration signal generally occurs in a form of a direct current; and the measured drifting signal is practically presented to be a periodic (or back-and-forth) acceleration-and-deceleration sense signal having a relatively-low frequency.

Because of the environment of the road surface 21, the acceleration sense signal S1 includes a road surface environment noise. The road surface environment noise includes at least one of a first signal, a second signal and a third signal. The first signal is a relatively-high frequency disturbance signal generated due to a successive contact collision between the wheel and the ground when the front wheel 222 and the rear wheel 223 roll on the road surface 21. The second signal is a relatively-intermediate frequency disturbance signal generated due to a motion that the front wheel 222 and the rear wheel 223 jolt over the road surface 21. When a road having an inclination variation, the third signal is a relatively-low frequency disturbance signal generated due to the inclination variation when the front wheel 222 and the rear wheel 223 roll on the road surface 21 along the road. For instance, the road is an uphill road, a downhill road, a plane road, or an undulated uphill-and-downhill road. For instance, a low-pass filtering performed to the acceleration sense signal S1 results in a result signal. The result signal shows a fluctuated road inclination angle of the road. The alert device 23 performs an operation to the result signal to cause the acceleration bias and the intrinsic bias included in the acceleration sense signal S1 to return to zero, wherein the acceleration bias is formed due to the road surface inclination, and the intrinsic bias of the intrinsic noise is formed due to the intrinsic property of the accelerometer 2311.

The acceleration sense signal S1 includes a dynamic operation noise due to a dynamic operation of the bicycle 25. The dynamic operation noise includes at least one of a fourth signal and a fifth signal. The fourth signal is a disturbance signal generated due to a freely traveling motion of the bicycle 25 rolling on the road surface 21, without applying a cyclic pedaling operation on the pedal structure by the user 90. For instance, the fourth signal is a disturbance signal generated due to a motion that the device body 221 is acted by the first and the second reaction force F11 and F12 due to the uncertain fluctuation of the road surface 21. The fifth signal is a disturbance signal generated due to a motion that the user 90 applies a cyclic pedaling operation on the pedal structure to drive the bicycle 25 to travel on the road surface 21. For instance, the fifth signal includes a disturbance signal generated due to the abovementioned uncertain fluctuation of the road surface 21, and a periodic motion signal such as a cycling pedaling signal generated by the cyclic pedaling operation.

Figure 3:
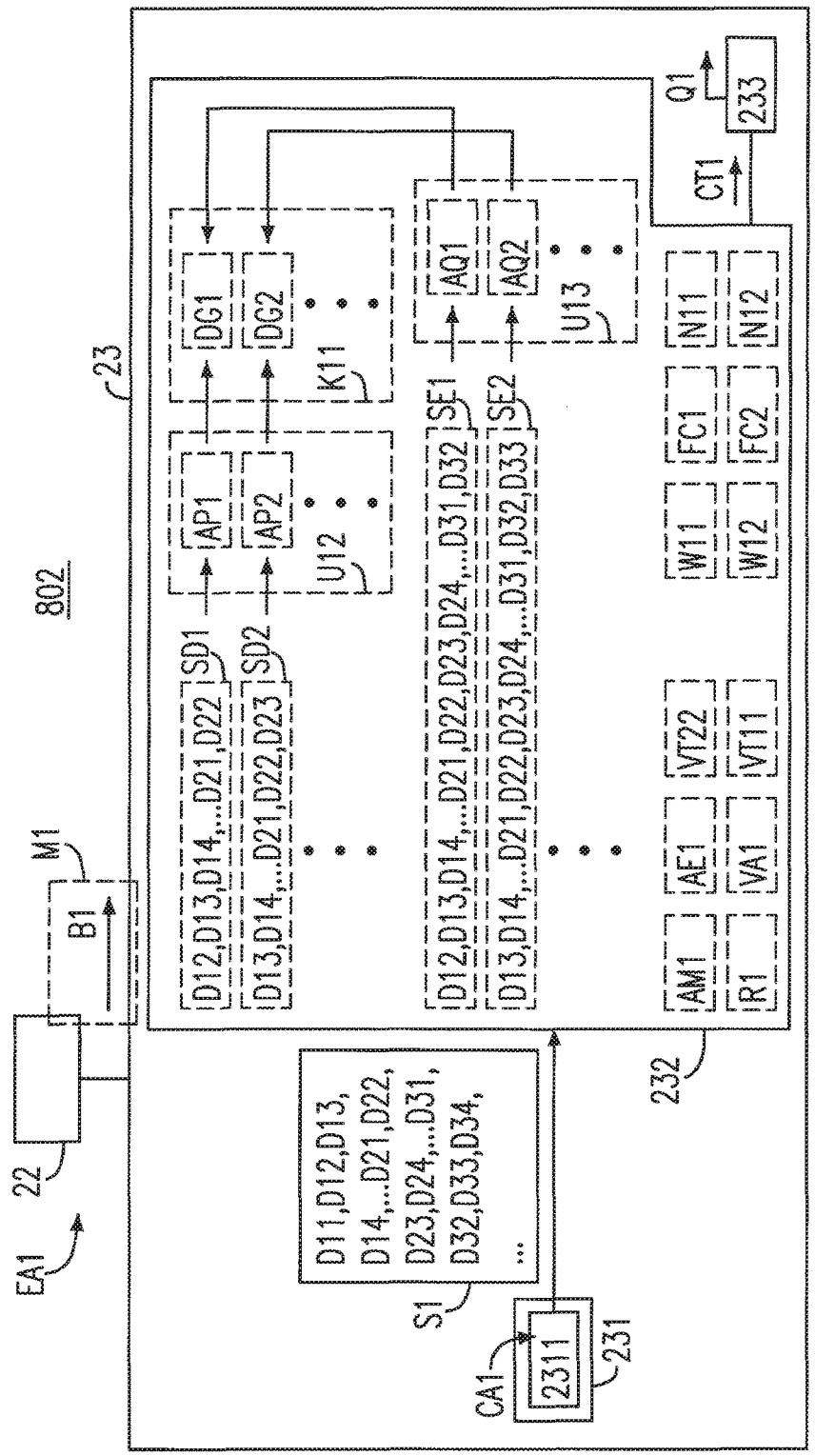
FIG. 3 is a schematic diagram showing a motion system according to various embodiments of the present disclosure.
Figure 4A:
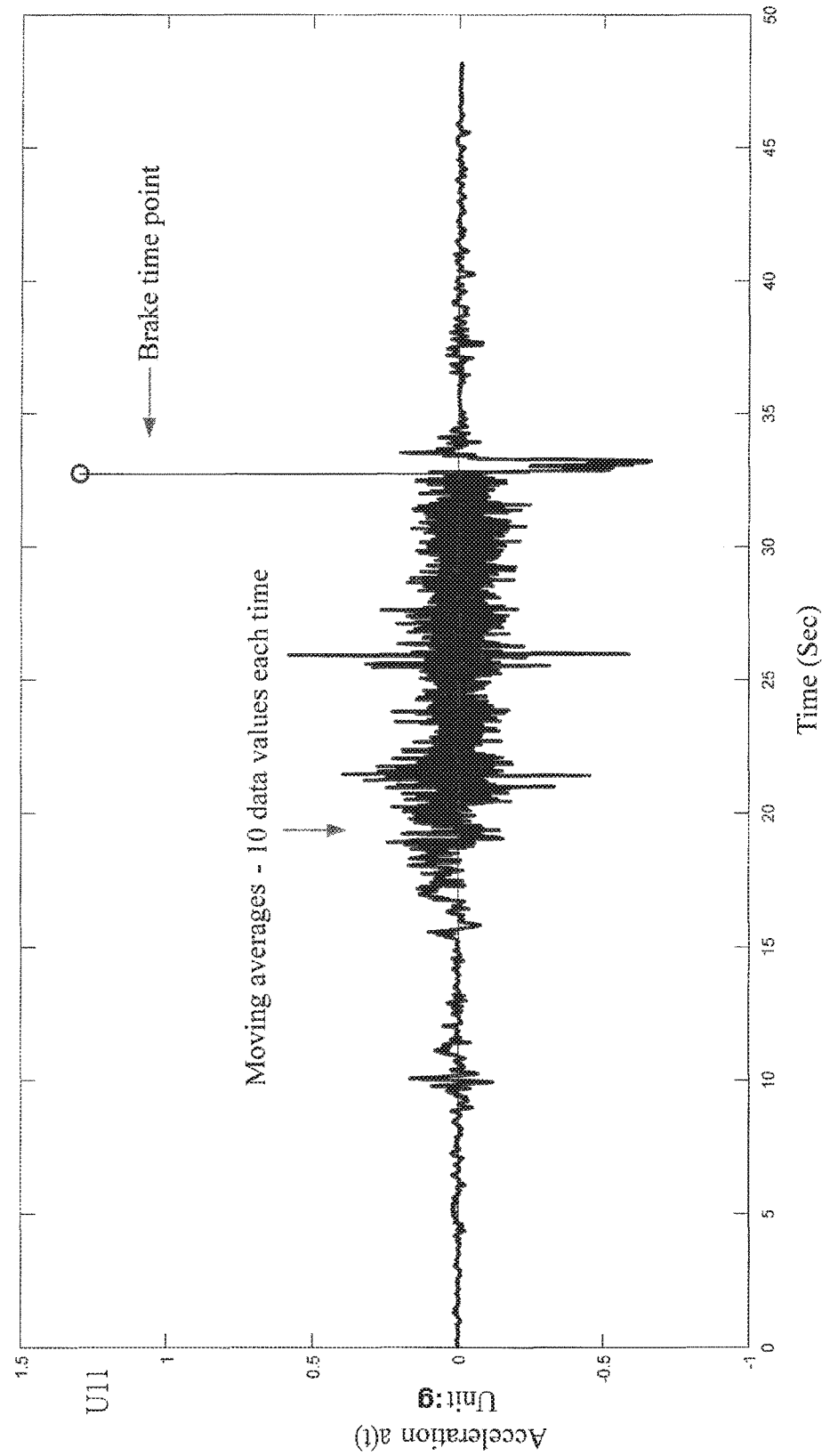
FIG. 4A is an acceleration variation diagram showing an acceleration of a first acceleration average data signal associated with the moving device.
Figure 4B:
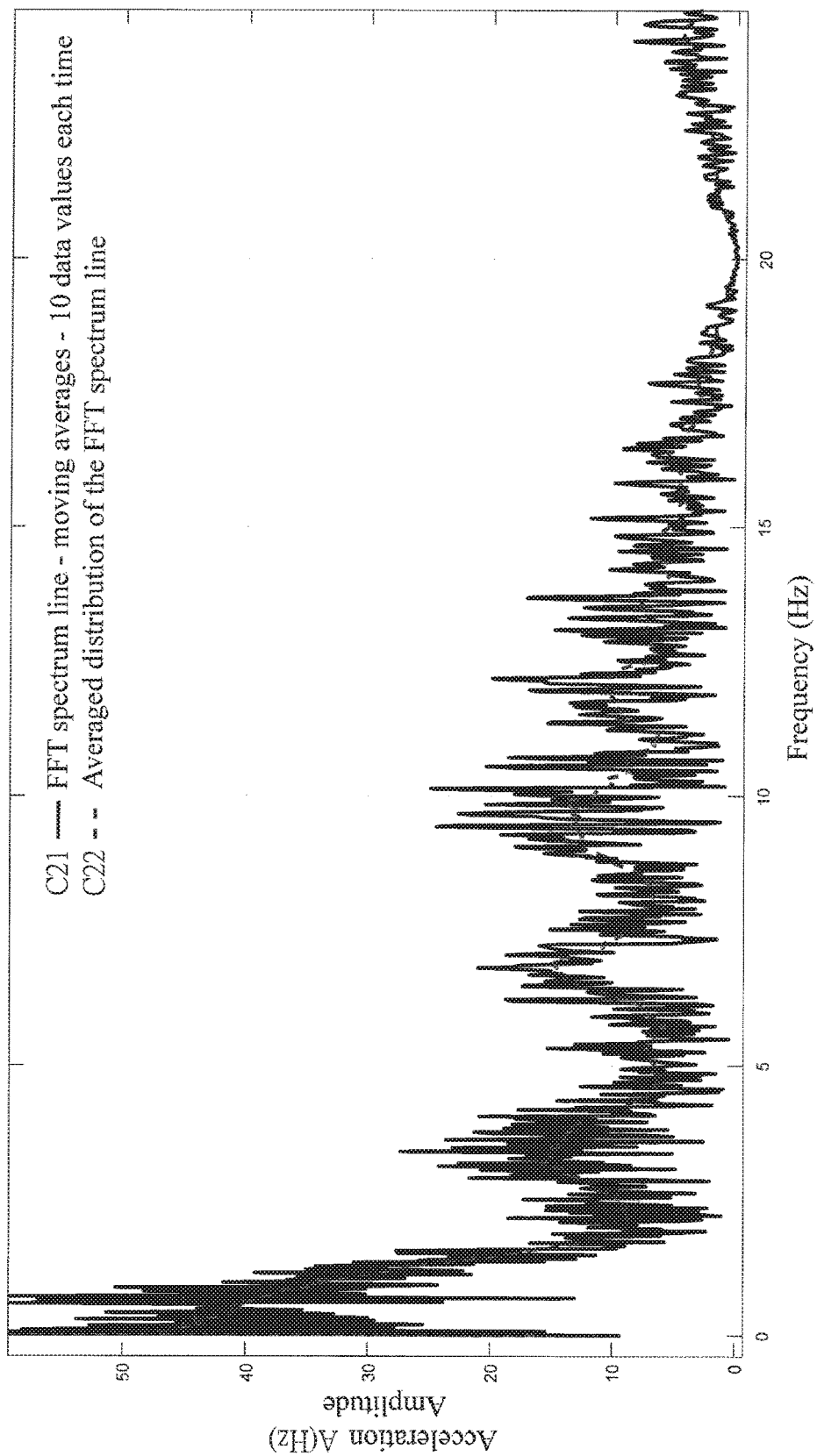
FIG. 4B is a relation diagram showing an estimated acceleration configured to correspond to the first acceleration average data signal and changing according to a frequency.

Please refer to FIG. 3, FIG. 4A and FIG. 4B, FIG. 5A and FIG. 5B, FIG. 6A and FIG. 6B, FIG. 7 and FIG. 8. FIG. 3 is a schematic diagram showing a motion system 802 according to various embodiments of the present disclosure. FIG. 4A is an acceleration variation diagram showing an acceleration of a first acceleration average data signal U11 associated with the moving device 22 in the time domain FIG. 4B is a relation diagram showing an estimated acceleration A(Hz) in frequency domain, configured to correspond to the first acceleration average data signal U11 and changing according to a frequency. The first acceleration average data signal U11 as shown in FIG. 4A is obtained based on the acceleration sense signal S1, a moving average algorithm AM1, and a predetermined sample size characterizing a data frame or a window length employed by the moving average algorithm AM1, wherein the predetermined sample size is equal to 10. A first moving average operation employing the moving average algorithm AM1 is performed to generate the first acceleration average data signal U11 in the time domain. The first moving average operation includes steps of: such as, (1) applying the first data position of the data frame or the window length covering such as 10 values at the first acceleration value of a data stream representing the acceleration sense signal S1 and (2) calculating an average of 10 acceleration values covered by the data frame to perform a filtering process to the covered 1~10 acceleration values, then shifting forward or backward the first data position of the frame to the next value (or the second acceleration value) in the data stream to calculate a next average value for the 2~11 acceleration values covered by the frame; and repetitively and sequentially shift the first data position of the frame to a new value next to the old one to correspondingly calculate a new average or perform a filtering process for the new covered 10 acceleration values as the abovementioned steps to generate the first acceleration average data signal U11 in the time domain. The acceleration variation diagram in the time domain as shown in FIG. 4A is transformed into the acceleration frequency spectrum diagram in the frequency domain as shown in FIG. 4B by using a fast Fourier transformation (FFT), or is transformed into a physical-quantity amplitude frequency spectrum diagram or a power frequency spectrum diagram associated with the variable acceleration B1 by using a fast Fourier transformation.

Figure 5A:
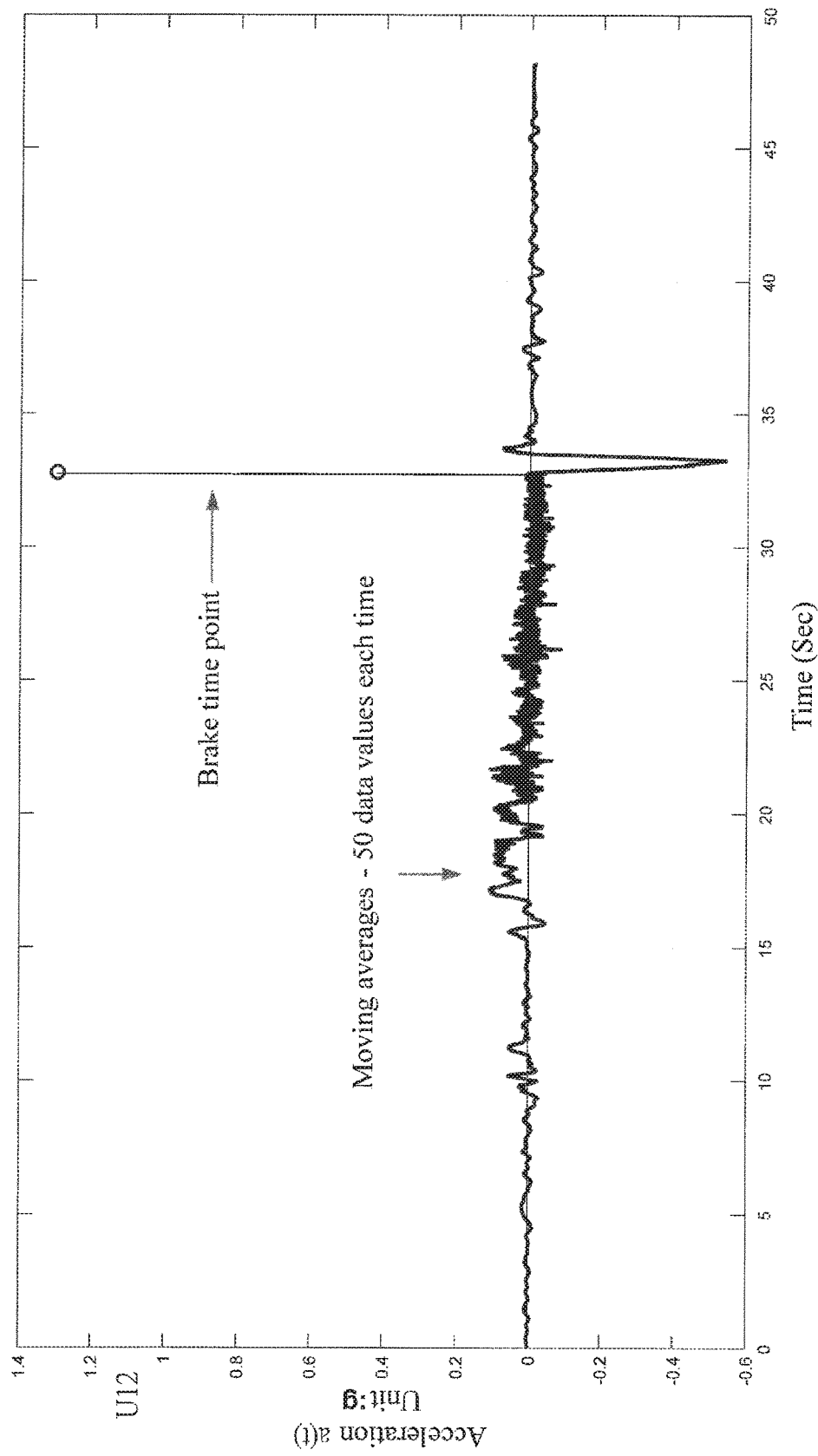
FIG. 5A is an acceleration variation diagram showing an acceleration of a second acceleration average data signal associated with the moving device.
Figure 5B:
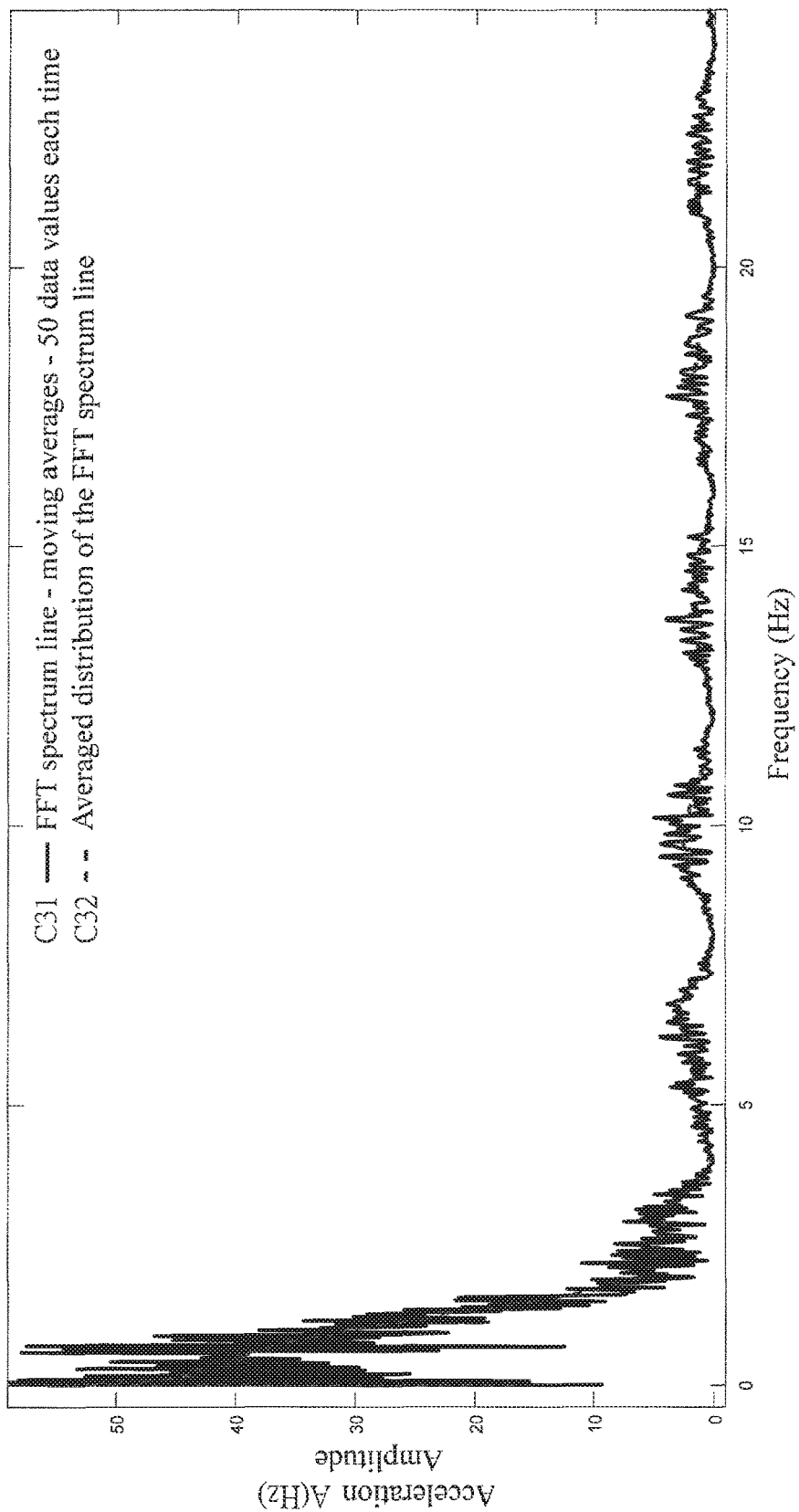
FIG. 5B is a relation diagram showing an estimated acceleration configured to correspond to the second acceleration average data signal and changing according to a frequency.

FIG. 5A is an acceleration variation diagram showing an acceleration of a second acceleration average data signal U12 associated with the moving device 22 in the time domain FIG. 5B is a relation diagram showing an estimated acceleration A(Hz) configured to correspond to the second acceleration average data signal U12 and changing according to a frequency. The second acceleration average data signal U12 as shown in FIG. 5A is obtained based on the acceleration sense signal S1, the moving average algorithm AM1, and a first predetermined sample size N11 employed by the moving average algorithm AM1, wherein the first predetermined sample size N11 is equal to 50. A second moving average operation employing the moving average algorithm AM1 is performed to generate the second acceleration average data signal U12 in the time domain. The second moving average operation includes steps of: such as, (1) applying the first data position of the data frame or the window length covering such as 50 values at the first acceleration value of a data stream representing the acceleration sense signal S1 and (2) calculating an average of 50 acceleration values covered by the data frame to perform a filtering process to the covered 1~50 acceleration values, then shifting forward or backward the first data position of the frame to the next value (or the second acceleration value) in the data stream to calculate a next average value for the 2~51 acceleration values covered by the frame; and repetitively and sequentially shift the first data position of the frame to a new value next to the old one to correspondingly calculate a new average or perform a filtering process for the new covered 50 acceleration values as the abovementioned steps to generate the second acceleration average data signal U12 in the time domain. The acceleration variation diagram in the time domain as shown in FIG. 5A is transformed into the acceleration frequency spectrum diagram in the frequency domain as shown in FIG. 5B by using a fast Fourier transformation (FFT), or is transformed into a physical-quantity amplitude frequency spectrum diagram or a power frequency spectrum diagram associated with the variable acceleration B1 by using a fast Fourier transformation.

Figure 6A:
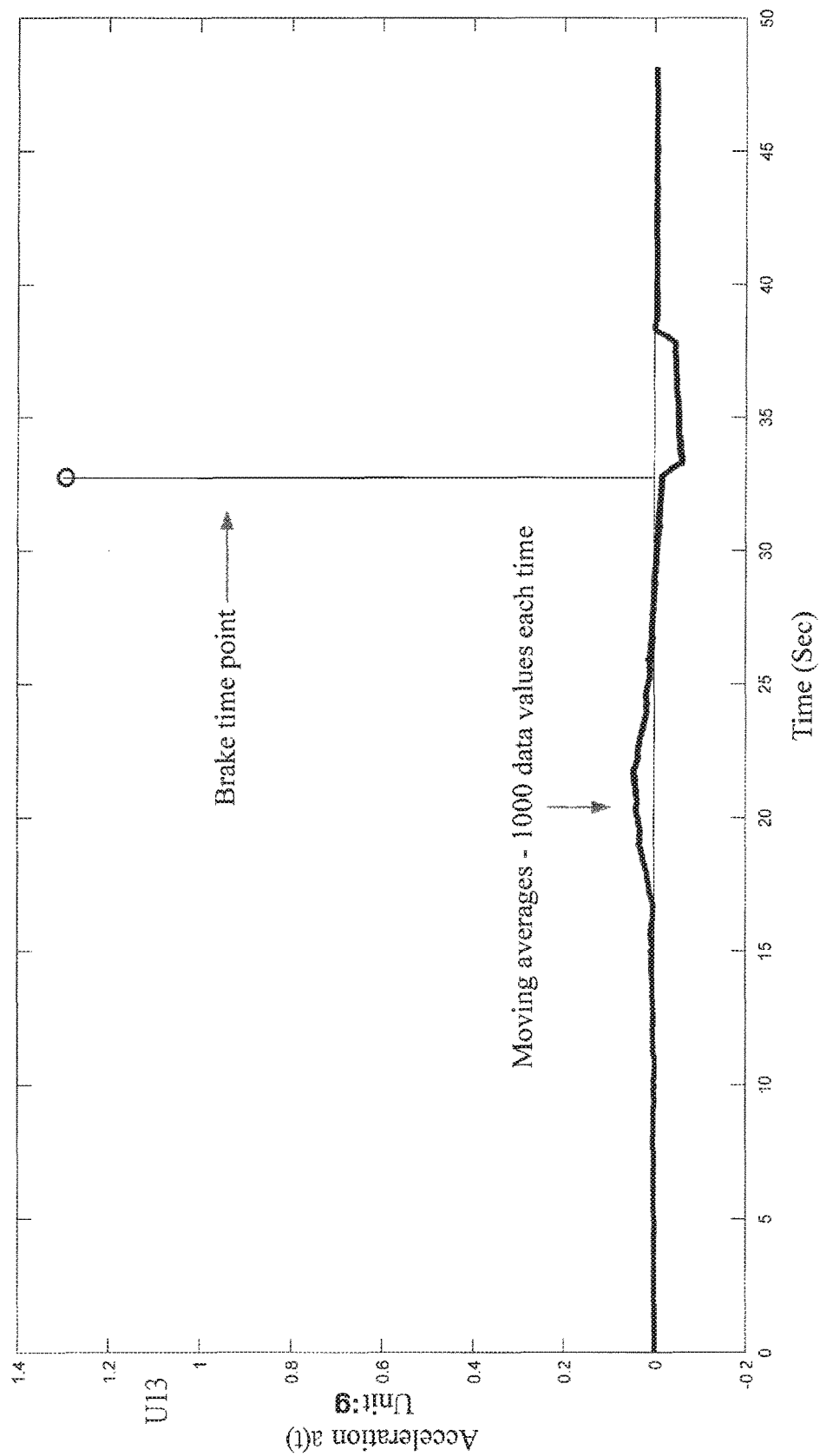
FIG. 6A is an acceleration variation diagram showing an acceleration of a third acceleration average data signal associated with the moving device.
Figure 6B:
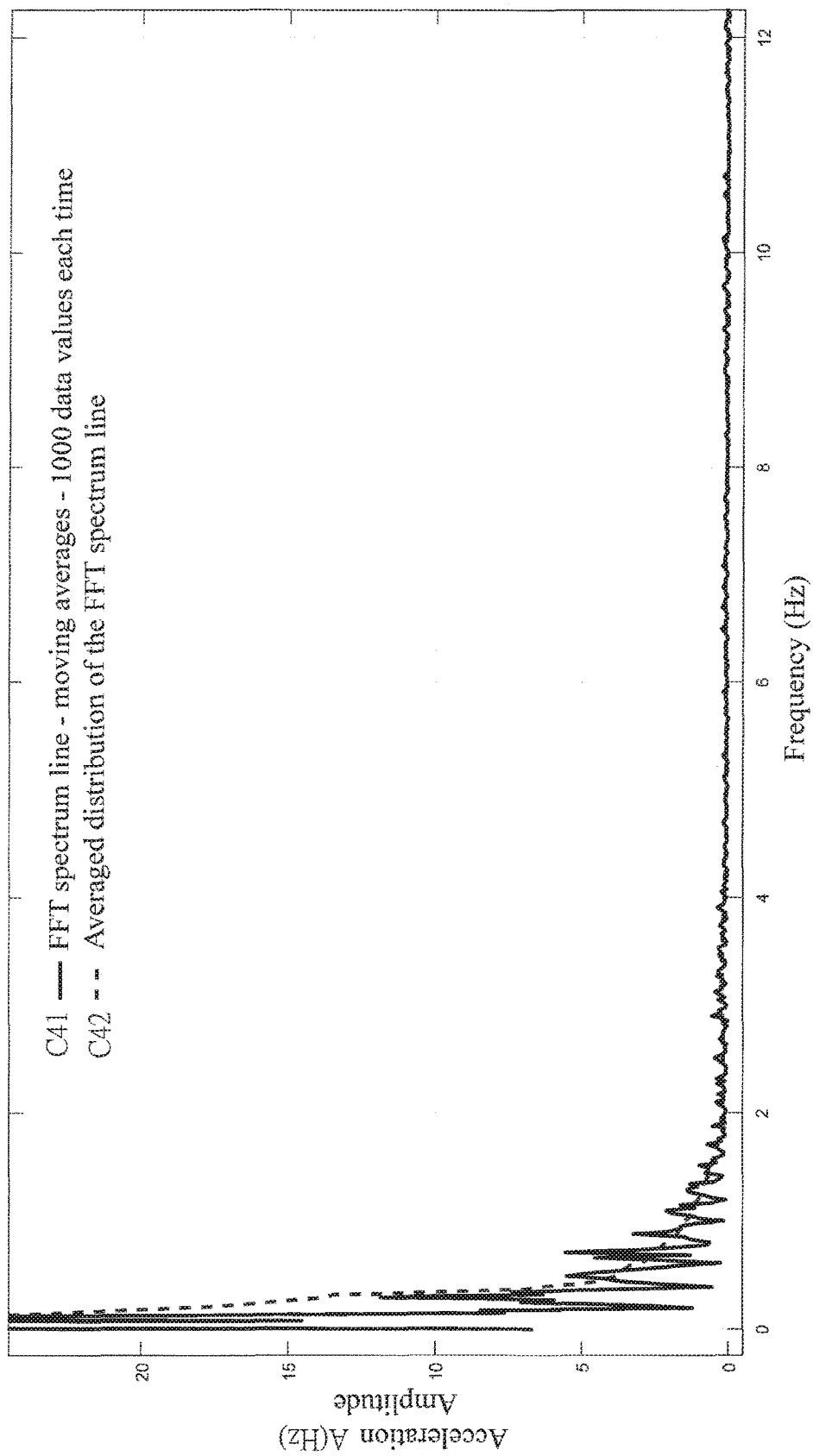
FIG. 6B is a relation diagram showing an estimated acceleration configured to correspond to the third acceleration average data signal and changing according to a frequency.

FIG. 6A is an acceleration variation diagram showing an acceleration of a third acceleration average data signal U13 associated with the moving device 22 in the time domain FIG. 6B is a relation diagram showing an estimated acceleration A(Hz) configured to correspond to the third acceleration average data signal U13 and changing according to a frequency. The third acceleration average data signal U13 as shown in FIG. 6A is obtained based on the acceleration sense signal S1, the moving average algorithm AM1, and a second predetermined sample size N12 employed by the moving average algorithm AM1, wherein the second predetermined sample size N12 is equal to 1000. A third moving average operation employing the moving average algorithm AM1 is performed to generate the third acceleration average data signal U13 in the time domain. The third moving average operation includes steps of: such as, (1) applying the first data position of the data frame or the window length covering such as 1000 values at the first acceleration value of a data stream representing the acceleration sense signal S1 and (2) calculating an average of 1000 acceleration values covered by the data frame to perform a filtering process to the covered 1~1000 acceleration values, then shifting forward or backward the first data position of the frame to the next value (or the second acceleration value) in the data stream to calculate a next average value for the 2~1001 acceleration values covered by the frame; and repetitively and sequentially shift the first data position of the frame to a new value next to the old one to correspondingly calculate a new average or perform a filtering process for the new covered 1000 acceleration values as the above-mentioned steps to generate the third acceleration average data signal U13 in the time domain. The acceleration variation diagram in the time domain as shown in FIG. 6A is transformed into the acceleration frequency spectrum diagram in the frequency domain as shown in FIG. 6B by using a fast Fourier transformation (FFT), or is transformed into a physical-quantity amplitude frequency spectrum diagram or a power frequency spectrum diagram associated with the variable acceleration B1 by using a fast Fourier transformation.

Figure 7:
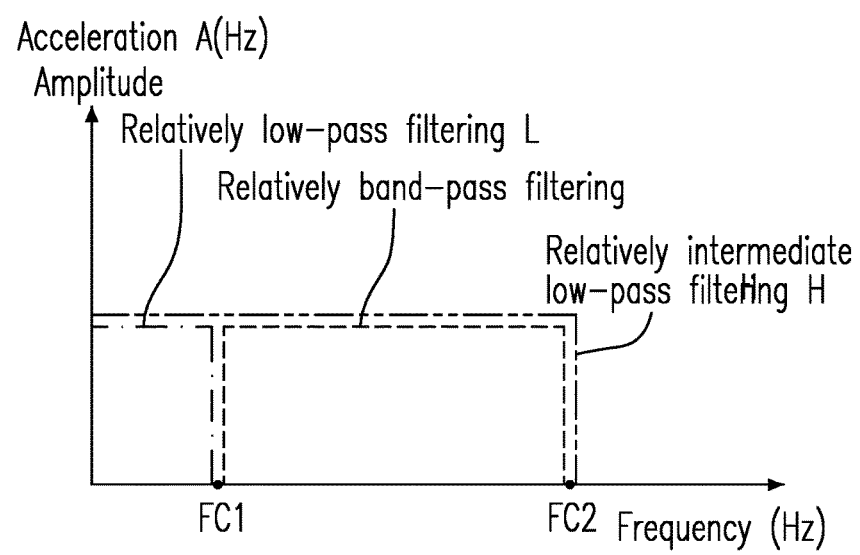
FIG. 7 is a schematic diagram showing a function of a quasi-band-pass filtering according to various embodiments of the present disclosure.
Figure 8:
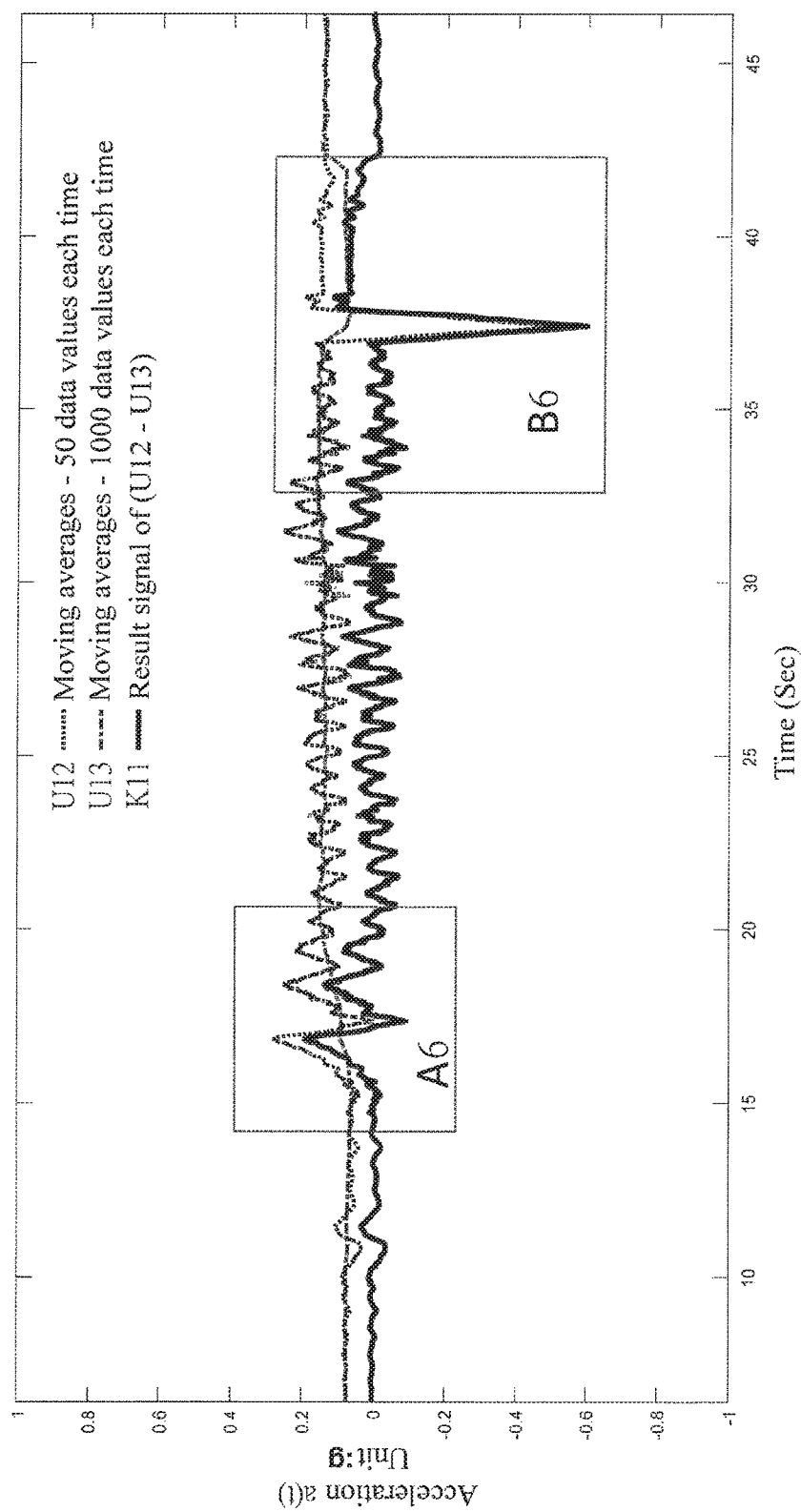
FIG. 8 is a relation diagram showing the second acceleration average data signal, the third acceleration average data signal, and an acceleration difference data signal between the second and the third acceleration average data signals.

FIG. 7 is a schematic diagram showing a function of a quasi-band-pass filtering according to various embodiments of the present disclosure. FIG. 8 is a relation diagram showing the second acceleration average data signal U12, the third acceleration average data signal U13, and an acceleration difference data signal K11 between the second and the third acceleration average data signals U12 and U13.

As shown in FIG. 3, the motion system 802 includes a moving device 22, and an alert device 23 coupled to the moving device 22. In some embodiments, the alert device 23 for the moving device 22 having a variable acceleration B1 includes a sensing unit 231, a processor 232 coupled to the sensing unit 231, and an alert unit 233 coupled to the processor 232. The sensing unit 231 includes an accelerometer 2311, and generates an acceleration sense signal S1 in response to the variable acceleration B1, wherein the sensing unit 231 senses the variable acceleration B1 to generate the acceleration sense signal S1, and the acceleration sense signal S1 includes a plurality of acceleration data D11, D12, D13, D14, . . . , D21, D22, D23, D24, . . . , D31, D32, D33, D34, . . . . For instance, the plurality of acceleration data D11, D12, D13, D14, . . . , D21, D22, D23, D24, . . . , D31, D32, D33, D34, . . . are a plurality of acceleration values, and is generated by the accelerometer 2311.

The processor 232 employs a moving average algorithm AM1, selects a first acceleration data sample SD1 having a first predetermined sample size N11 from the plurality of acceleration data D11, D12, D13, D14, . . . , D21, D22, D23, D24, . . . , D31, D32, D33, D34, . . . based on the first predetermined sample size N11 and the moving average algorithm AM1, selects a second acceleration data sample SE1 having a second predetermined sample size N12 from the plurality of acceleration data D11, D12, D13, D14, . . . , D21, D22, D23, D24, . . . , D31, D32, D33, D34, . . . based on the second predetermined sample size N12, and the moving average algorithm AM1, and calculates correspondingly a first sample average AP1 of the first acceleration data sample SD1 and a second sample average AQ1 of the second acceleration data sample SE1. The processor 232, based on a first sample average difference DG1 between the first and the second sample averages AP1 and AQ1, makes a decision R1 whether an alert signal Q1 for the variable acceleration B1 shall be sent out. For instance, when the decision R1 is positive, the processor 232 causes the alert unit 233 to send out the alert signal Q1. In some embodiments, when the decision R1 is positive, the processor 232 outputs a control signal CT1, which causes the alert unit 233 to send out the alert signal Q1. For instance, the second predetermined sample size N12 is relatively one of greater and less than the first predetermined sample size N11. Under a condition that the second predetermined sample size N12 is relatively greater than the first predetermined sample size N11, the processor 232 subtracts the second sample average AQ1 from the first sample average AP1 to obtain the first sample average difference DG1.

In short, the moving average algorithm AM1 and the first predetermined sample size N11 are used to filter out a first acceleration component with higher frequencies such as the shake signal or the periodic/random vibration signal contained in the acceleration signal S1 and renders the first sample average AP1 containing the deceleration signal to be evaluated. In similar, the moving average algorithm AM1 and the second predetermined sample size N12 are used to filter out a second acceleration component with a medium and the higher frequencies such as the aforementioned the cyclic pedaling signal and the shake signal or the periodic/random vibration signal contained in the acceleration signal S1 and renders the second sample average AQ1 containing the aforementioned the gravity component of the gravity and/or the gravity bias or the acceleration bias LF1 with lower frequencies. Subtracting the second sample average AQ1 from the first sample average AP1 filters out the second acceleration component having the gravity bias or the acceleration bias with lower frequencies for the first sample average AP1 and renders the first sample average difference DG1 containing a filtered acceleration signal and the deceleration signal to be evaluated, thus distributing along the abscissa of g=0 as shown in FIG. 8.

In some embodiments, the processor 232 employs a predetermined check algorithm AE1, obtains a derived resultant value VA1 based on the predetermined check algorithm AE1 and the first sample average difference DG1, and makes the decision R1 by comparing the derived resultant value VA1 with a predetermined threshold value VT11. For instance, when the derived resultant value VA1 is greater than the predetermined threshold value VT11, the decision R1 is determined to be positive. For instance, the derived resultant value VA1 is a selected resultant value.

In some embodiments, the processor 232, based on the first predetermined sample size N11, the moving average algorithm AM1 and the acceleration sense signal S1, repetitively and sequentially selects a third, a fifth, a seventh, . . . acceleration data sample SD2, SD3 (not shown), SD4 (not shown), . . . from the plurality of acceleration data D11, D12, D13, D14, . . . , D21, D22, D23, D24, . . . , D31, D32, D33, D34, . . . , calculates correspondingly a third sample average AP2 of the third acceleration data sample SD2, a fifth sample average AP3 (not shown) of the fifth acceleration data sample SD3, and a seventh sample average AP4 (not shown) of the seventh acceleration data sample SD4, . . . and thereby forms the second acceleration average data signal U12 including a first plurality of sample averages AP1, AP2, . . . .

The processor 232, based on the second predetermined sample size N12, the moving average algorithm AM1 and the acceleration sense signal S1, repetitively and sequentially selects a fourth, a sixth, a eighth, . . . acceleration data sample SE2, SE3 (not shown), SE4 (not shown), . . . from the plurality of acceleration data D11, D12, D13, D14, . . . , D21, D22, D23, D24, . . . , D31, D32, D33, D34, . . . , calculates correspondingly a fourth sample average AQ2 of the fourth acceleration data sample SE2, a sixth sample average AQ3 (not shown) of the sixth acceleration data sample SE3, an eighth sample average AQ4 (not shown) of the eighth acceleration data sample SE4, . . . and thereby forms the third acceleration average data signal U13 including a second plurality of sample averages AQ1, AQ2, . . . . The second plurality of sample averages AQ1, AQ2, . . . may be configured to respectively correspond to the first plurality of sample averages AP1, AP2, . . . .

The processor 232 obtains an acceleration difference data signal K11 between the second acceleration average data signal U12 and the third acceleration average data signal U13, and decides whether an alert signal Q1 for the variable acceleration B1 shall be sent out, wherein the processor 232 makes a decision R1 whether to cause the alert unit 233 to send out the alert signal Q1. When the decision R1 is positive, the processor 232 causes the alert unit 233 to send out the alert signal Q1. For instance, the processor 232 subtracts the third acceleration average data signal U13 from the second acceleration average data signal U12 to obtain the acceleration difference data signal K11 by performing a subtraction operation. The processor 232 obtains a plurality of sample average differences DG1, DG2, . . . by respectively subtracting the second plurality of sample averages AQ1, AQ2, . . . from the first plurality of sample averages AP1, AP2, . . . , and thereby forms the acceleration difference data signal K11. The acceleration difference data signal K11 includes the plurality of sample average differences DG1, DG2, . . . respectively corresponding to the first plurality of sample averages AP1, AP2, . . . . For instance, the processor 232, based on the acceleration difference data signal K11, makes the decision R1 whether the motion M1 has a designated deceleration to occur, wherein the designated deceleration is a brake deceleration.

In some embodiments, the processor 232 employs the predetermined check algorithm AE1, analyzes the acceleration difference data signal K11 (or the plurality of sample average differences DG1, DG2, . . . ) based on the predetermined check algorithm AE1 to obtain the derived resultant value VA1, and makes the decision R1 by comparing the derived resultant value VA1 with the predetermined threshold value VT11.

In some embodiments, in order to make the decision R1, it is necessary for the alert device 23 to filter out the vibration signal (or the noise) of the acceleration sense signal S1 so as to obtain the desired motion acceleration/deceleration sense signal of the acceleration sense signal S1. It is necessary for the signal processing of the acceleration sense signal S1 to consider filtering out the relatively-high frequency vibration noise. A low-pass filter has a cut-off frequency or a frequency bandwidth; and a selection of the frequency bandwidth or the cut-off frequency of the low-pass filter has a very critical influence on the decision R1 of the acceleration/deceleration. When the frequency bandwidth of the low-pass filter is narrower, the relatively-high frequency noise cannot pass. Under this condition, the signal component with the relatively low frequencies or some signal component of the acceleration/deceleration signal which should be definitely sensed, however is possible to be filtered out, twisted, or even distorted due to the narrower bandwidth, making a detection of insufficient acceleration/deceleration signal components. In this situation, the sensed acceleration/deceleration signal components is easily reduced by the low-pass filtering process, and a relatively small acceleration/deceleration of the moving device 22 is hardly to be revealed for evaluation by the algorithm to alert the velocity change due to such braking operation.

In some embodiments, a recognition that the deceleration happens due to braking has the following consideration factors. Firstly, a diagram that the acceleration is distributed according to the time axis is considered. Because the deceleration property associated with braking is just to slow the speed, the brake operation causes theoretically the acceleration of the motion M1 to be all less than zero during the brake operation. That is, in a phase that the acceleration is less than zero, there is a deceleration area enclosed between the deceleration curve and the zero-reference axis, wherein the deceleration area is configured to represent a magnitude of the deceleration. The processor 232 decides whether the moving device 22 does a deceleration motion by deciding whether there is a sufficiently distinctive estimated area enclosed with the deceleration signal curve resulting from that the acceleration is less than zero, wherein the sufficiently distinctive estimated area is used to represent the deceleration area below the zero-reference axis.

Secondly, this enclosed area has a value in magnitude and is determined by the algorithm AE1 performed in the processor 232. There is a viewpoint that a relatively acceleration and a relatively deceleration existing in the up-and-down and fast-and-slow motion resulting from the road surface fluctuation counteract. When the magnitude of the enclosed area is less than or equal to a first threshold value (there is a signal error band defined therebetween), the algorithm AE1 performed in the processor 232 decides that the velocity change of the motion M1 is not a monotonic deceleration motion, but a reciprocal motion which causes a sum of the acceleration and the deceleration to be zero, to approach zero, or to be less than this first threshold value (or to be within the signal error band). That is, when collisions occurring between the road surface 21 and tires of the moving device 22 due to the road surface fluctuation cause the moving device 22 to jolt, and the acceleration resulting from the jolting of the moving device 22 is an alternating variation signal around the zero-reference axis of acceleration, there are an acceleration distribution portion greater than zero and a deceleration distribution portion less than zero. The acceleration distribution portion forms a first area above the zero-reference axis, which is greater than zero; the deceleration distribution portion forms a second area beneath the zero-reference axis, which is less than zero; and a sum of the first and the second areas intrinsically approaches zero. When the motion M1 forms a plurality of acceleration/deceleration areas, the algorithm AE1 performed in the processor 232 can determine a result value of the plurality of acceleration/deceleration areas, and by comparing the result value with a second threshold value, decides whether the motion M1 is exactly a deceleration motion resulting from the braking.

The recognition that the deceleration happens due to braking includes a second consideration factor, which is a return-to-zero operation. For instance, the zero is regarded as a stable reference value. When performing a data processing of a deceleration calculation, the processor 232 performs the return-to-zero operation based on a return-to-zero criticism. Under a condition that the return-to-zero operation is neglected, there is a possibility that the processor 232 makes a misjudging or delays to make a decision. Therefore, the processor 232 determines the first threshold value or the signal error band to confine the noise resulting from an operation environment or the intrinsic property of the accelerometer 2311, and thereby avoids an interference induced by a relevant noise when making a decision based on a result of an acceleration-value accumulation calculation containing the relevant noise.

The moving average algorithm AM1 is employed to move a specific data frame on the collected data, wherein the specific data frame is configured to contain a specific number of variable data. The moving average algorithm AM1 each time calculates an average of the specific number of variable data, and finishes an average operation to the collected data based on the specific number of variable data through a plurality of sequential movements of the specific data frame. A data processing of the moving average algorithm AM1 is similar to a relatively-low frequency filtering performed to a signal on the physical behavior corresponding to the signal processing. A cut-off frequency or a low-pass frequency bandwidth of the relatively-low frequency filtering is associated with a data quantity or a data sample size of the variable data contained in the specific data frame, wherein an average operation is performed to the variable data contained in the specific data frame each time. The larger data sample size the moving average operation is performed each time, the narrower low-pass frequency bandwidth or the lower cut-off frequency the relatively-low frequency filtering has.

As shown in FIG. 4A, the acceleration variation diagram of the first acceleration average data signal U11 is a result that the collected acceleration sense signal S1 is processed according to a plurality of average operations and a data frame containing 10 variable data values, wherein the first acceleration average data signal U11 represents an estimated acceleration distribution with respect to a time, and an average operation is performed to the data frame in response to moving the data frame on the collected acceleration sense signal S1 each time. As shown in FIG. 4B, FIG. 4B is a frequency-spectrum analysis diagram of FIG. 4A; and after the plurality of average operations, the filtered acceleration amplitude distribution in FIG. 4B is compared with a reference amplitude equal to 3, so that a cut-off frequency of the low-pass filtering is shown to be about equal to 18 Hz. In FIG. 4B, the acceleration distribution in the frequency domain is represented by the curve C21; and an averaged distribution of the acceleration distribution in the frequency domain is represented by the curve C22. Furthermore, after the filtering process that the data frame is moved each time to contain 10 values of data to be averaged, the signal components of the collected acceleration sense signal S1 with the acceleration amplitude greater than 3 pass, wherein the frequency bandwidth corresponding to the passed signal components is about equal to 18 Hz.

As shown in FIG. 5A, the acceleration variation diagram of the second acceleration average data signal U12 is a result that the collected acceleration sense signal S1 is processed according to a plurality of average operations and a data frame containing 50 variable data values (or the first predetermined sample size N11), wherein the second acceleration average data signal U12 represents an estimated acceleration distribution with respect to a time, and an average operation is performed to the data frame in response to moving the data frame on the collected acceleration sense signal S1 each time. As shown in FIG. 5B, FIG. 5B is a frequency-spectrum analysis diagram of FIG. 5A; and after the plurality of average operations, the filtered acceleration amplitude distribution in FIG. 5B is compared with a reference amplitude equal to 3, so that a signal frequency bandwidth greater than the reference amplitude is shown to be about equal to 10 Hz, wherein a signal component greater than 10 Hz is shown to have frequency multiplication harmonics. In FIG. 5B, the acceleration distribution in the frequency domain is represented by the curve C31; and an averaged distribution of the acceleration distribution in the frequency domain is represented by the curve C32. For instance, the first predetermined sample size N11 is ranged between 10 and 90; and in other words, the data frame (a first predetermined data frame W11) has or is characterized by the first predetermined sample size N11. For instance, the first predetermined sample size N11 is equal to $N \times 10^1$, wherein N is ranged between 1 and 9.

As shown in FIG. 6A, the acceleration variation diagram of the third acceleration average data signal U13 is a result that the collected acceleration sense signal S1 is processed according to a plurality of average operations and a data frame containing 1000 variable data values (or the second predetermined sample size N12), wherein the third acceleration average data signal U13 represents an estimated acceleration distribution with respect to a time, and an average operation is performed to the data frame in response to moving the data frame on the collected acceleration sense signal S1 each time. As shown in FIG. 6B, FIG. 6B is a frequency-spectrum analysis diagram of FIG. 6A; and after the plurality of average operations, the filtered acceleration amplitude distribution in FIG. 6B is compared with a reference amplitude equal to 3, so that a signal frequency bandwidth greater than the reference amplitude is shown to be about equal to 2 Hz. In FIG. 6B, the acceleration distribution in the frequency domain is represented by the curve C41; and an averaged distribution of the acceleration distribution in the frequency domain is represented by the curve C42. For instance, the second predetermined sample size N12 is ranged between 1000 and 9000; and in other words, the data frame (a second predetermined data frame W12) has or is characterized by the second predetermined sample size N12. For instance, the second predetermined sample size N12 is equal to $M \times 10^3$, wherein M is ranged between 1 and 9.

As shown in FIGS. 5A, 5B, 6A and 6B, a calculation method employing the moving average algorithm AM1 performs a quasi-band-pass filtering function to process the abovementioned collected acceleration signal. As shown in FIGS. 6A and 6B, a plurality of average operations of 1000 data values is used to filter out a relatively-intermediate-and-high frequency signal component. A processing effect of the plurality of average operations is similar to that of a first low-pass filter having a relatively-low low-pass cut-off frequency FC1. In the present embodiment, the first low-pass filter can cause a first signal component to pass, wherein the passed first signal component has a frequency range being about from 0.1 Hz to 2 Hz; i.e. a relatively-high frequency signal component with a frequency range greater than 2 Hz can be filtered out in principle. The first low-pass filter has a low-pass cut-off frequency about equal to 2 Hz, as shown in FIG. 6B. Furthermore, by using the moving average algorithm AM1, a data having about 1000 values is dynamically averaged to establish a relatively-low frequency bandwidth of a band-pass filtering (i.e. the relatively-low low-pass cut-off frequency FC1) to filter out a disturbance noise, and to output a mid-value or an average value of the acquired acceleration signal. That is, the acceleration signal output by this relatively-low frequency filtering can show a gravitational acceleration variation associated with the road surface fluctuation or the road surface inclination, and the intrinsic bias of the accelerometer 2311.

As shown in FIGS. 5A and 5B, a plurality of average operations of 50 data values are used to filter out a relatively-high frequency signal component. A processing effect of the plurality of average operations is similar to that of a second low-pass filter having a relatively-high low-pass cut-off frequency FC2 about equal to 10 Hz. In the present embodiment, the second low-pass filter having the relatively-high low-pass cut-off frequency FC2 can cause the relatively-high frequency signal component to be filtered out. The relatively-high frequency signal component is mentioned with respect to the passed first signal component having a frequency range being about from 0.1 Hz to 2 Hz, wherein the passed first signal component is output due to the average of the 1000 data values for the low-pass filtering function. The second low-pass filter can cause a second signal component to pass, wherein the passed second signal component has a frequency range being about from 0.1 Hz to 10 Hz. Furthermore, by using the moving average algorithm AM1, a data having about 50 values is dynamically averaged to establish a relatively-high frequency bandwidth of a band-pass filtering (i.e. the relatively-high low-pass cut-off frequency FC2). The plurality of average operations cause the second signal component being a relatively-wider bandwidth acceleration signal component to pass due to the relatively-high frequency bandwidth, wherein the relatively-wider bandwidth acceleration signal component may includes a periodic acceleration signal with relatively-low frequencies generated due to the road surface fluctuation, an acceleration bias generated due to the road surface inclination or slope, or the intrinsic bias or the drifting noise of the accelerometer 2311.

According to the abovementioned descriptions, a subtraction operation can be performed that a plurality of averages (the third acceleration average data signal U13 as shown in FIG. 6A) generated by averaging 1000 data values each time are subtracted from a plurality of averages (the second acceleration average data signal U12 as shown in FIG. 5A) generated by averaging 50 data values each time. The subtraction operation can eliminate relatively-low frequency acceleration signal errors including the intrinsic bias of the accelerometer 2311, the gravitational acceleration bias generated due to the road surface inclination affecting the bicycle 25, and form an output signal for subsequent processing, wherein the output signal includes a relatively-high frequency acceleration signal associated with a pedal motion, and/or a deceleration signal. The subtraction operation is a data processing serving as a signal filtering, wherein the effect of the subtraction operation is similar to that of a band-pass filtering function as shown in FIG. 7.

The processor 232 employs the moving average algorithm AM1 to generate the second and the third acceleration average data signal U12 and U13, performs the subtraction operation serving as a quasi-band-pass filtering to generate an acceleration/deceleration signal (the acceleration difference data signal K11 as shown in FIG. 8) having various frequencies. The physical meanings of the acceleration difference data signal K11 are described as follows. The signal component with a frequency range 1 Hz-2 Hz includes an acceleration signal formed due to a pedal motion, and/or a brake deceleration signal. The signal component with a frequency range 1 Hz-10 Hz mainly includes an acceleration signal formed due to the road surface fluctuation. In addition, under the same sampling frequency, on the same road surface of a road, an acceleration signal frequency formed due to the road surface fluctuation or an acceleration signal frequency happened due to a jolt of the moving device 22 can be proportional to the pedal frequency or the vehicle travelling speed.

The processor 232 performs the second moving average operation to form the second acceleration average data signal U12 based on the first predetermined sample size N11 and the moving average algorithm AM1, performs the third moving average operation to form the third acceleration average data signal U13 based on the second predetermined sample size N12 and the moving average algorithm AM1, and subtracts the third acceleration average data signal U13 from the second acceleration average data signal U12 to obtain the acceleration difference data signal K11 by performing a subtraction operation. The second moving average operation includes a first plurality of selection operations of sequentially selecting a first plurality of acceleration data samples SD1, SD2, . . . from the plurality of acceleration data D11, D12, D13, D14, . . . , D21, D22, D23, D24, . . . , D31, D32, D33, D34, . . . according to a first specific data frame (or the first predetermined sample size N11), and a first plurality of average operations respectively corresponding to the first plurality of selection operations. That is, the second moving average operation performs a first low-pass filtering having the relatively-high low-pass cut-off frequency FC2. The first plurality of average operations respectively calculate a first plurality of sample averages AP1, AP2, . . . of the first plurality of acceleration data samples SD1, SD2, . . . .

The third moving average operation includes a second plurality of selection operations of sequentially selecting a second plurality of acceleration data samples SE1, SE2, . . . from the plurality of acceleration data D11, D12, D13, D14, . . . , D21, D22, D23, D24, . . . , D31, D32, D33, D34, . . . according to a second specific data frame (or the second predetermined sample size N12), and a second plurality of average operations respectively corresponding to the second plurality of selection operations. That is, the third moving average operation performs a second low-pass filtering having the relatively-low low-pass cut-off frequency FC1. The second plurality of average operations respectively calculate a second plurality of sample averages AQ1, AQ2, . . . of the second plurality of acceleration data samples SE1, SE2, . . . .

The subtraction operation performs a band-pass filtering, having the relatively-low low-pass cut-off frequency FC1 and the relatively-high low-pass cut-off frequency FC2, to output a signal component having a frequency range between the relatively-low low-pass cut-off frequency FC1 and the relatively-high low-pass cut-off frequency FC2, i.e. to form the acceleration difference data signal K11. The subtraction operation has a processing effect similar to that performed by a band-pass filter having a relatively-low band-pass cut-off frequency and a relatively-high band-pass cut-off frequency, wherein the relatively-low band-pass cut-off frequency and the relatively-high band-pass cut-off frequency are respectively equal to the relatively-low low-pass cut-off frequency FC1 and the relatively-high low-pass cut-off frequency FC2. FIG. 7 shows the relatively-low low-pass cut-off frequency FC1 and the relatively-high low-pass cut-off frequency FC2.

The second acceleration average data signal U12, the third acceleration average data signal U13 and the acceleration difference data signal K11 shown in FIG. 8 are derived from the motion M1 made by the bicycle 25, i.e. are obtained through a detection of the motion M1 of the bicycle 25 travelling on the road surface 21. The motion M1 includes a deceleration motion M11 due to a brake operation EA1 of the bicycle 25. The bicycle 25 has the following riding conditions to form the motion M1: a normal asphalt road surface, travelling on the undulated road, a speed about 10 Km/hr, and a braking operation. The second acceleration average data signal U12 is obtained to show the following characteristics: a periodic acceleration/deceleration distribution formed due to a pedal operation applied to the bicycle 25, an acceleration/deceleration distribution formed due to a fluctuation of the road surface 21, and a brake deceleration distribution formed due to the brake operation EA1.

In operation, the subtraction operation of subtracting the third acceleration average data signal U13 from the second acceleration average data signal U12 can eliminate the effect of an acceleration bias to cause a reference value of the acceleration difference data signal K11 to be a value of zero. The corresponding physical meanings thereof are described as follows. The second acceleration average data signal U12 can have a first component recognized as a relatively-high frequency deceleration signal separated from the high frequency noise. The third acceleration average data signal U13 can have a second component, corresponding to the first component, recognized as a relatively-low frequency gravitational acceleration variation signal associated with the road surface fluctuation or inclination and/or one of a relatively-low frequency intrinsic bias signal and a drifting noise of the accelerometer 2311. The processor 232 can perform a comparison between a predetermined brake deceleration threshold value (such as the predetermined threshold value VT11) and a subtraction result of subtracting the second component from the first component to turn on the brake light or to cause the alert unit 233 to send out the alert signal Q1.

In some embodiments, the processor 232 employs the predetermined check algorithm AE1 to estimate an integral area of the acceleration difference data signal K11 to obtain the derived resultant value VA1. In some embodiments, the predetermined check algorithm AE1 uses a count cooperated with a weight factor; and the processor 232 employs this predetermined check algorithm AE1 to analyze the acceleration difference data signal K11 so as to obtain the derived resultant value VA1. The processor 232 decides an occurrence of a designated deceleration by comparing the derived resultant value VA1 with the predetermined threshold value VT11, and decides whether a brake mode of the deceleration motion M11 is an emergency brake mode, a smooth brake mode or an intermittent brake mode. For instance, the designated deceleration is a brake deceleration. In FIG. 8, the acceleration difference data signal K11 has a first signal portion in a time duration A6, and has a second signal portion in a time duration B6. The second signal portion includes a brake signal; however, the first signal portion does not include a brake signal. The processor 232, based on the predetermined check algorithm AE1, decides that the deceleration motion M11 occurs in the time duration B6.

In some embodiments, the processor 232, based on the acceleration difference data signal K11, decides whether the brake deceleration magnitude and the deceleration time satisfy relevant threshold values in order to turn on the brake alert light. According to one embodiment in the present disclosure, a use of a band-pass filtering function is compared to that of a low-pass filtering function. When the low-pass filtering function is only performed under a condition that a cut-off frequency of the low-pass filtering function is relatively too low, the brake deceleration signal can be caused to twist or even be filtered out, and thus the deceleration variation cannot be evaluated. Furthermore, when the low-pass filtering function is only performed under a condition that a cut-off frequency of the low-pass filtering function is relatively too high, noises include the intrinsic bias of the accelerometer 2311 and/or the gravitational acceleration bias signal generated due to the road surface inclination cannot be filtered out; as a result, the subsequent accumulation processing of the acceleration/deceleration signal and the associated setting of the threshold value become very difficult, so that a judgment of the deceleration motion suffers very serious difficulty.

In some embodiments, the processor 232 obtains the acceleration difference data signal K11 as shown in FIG. 8, accumulates deceleration values at different time points for a specific time interval of the acceleration difference data signal K11. If an absolute value of the accumulated deceleration value is greater than a deceleration threshold value within the specific time interval, the processor 232 decides that a brake operation of the moving device 22 occurs. In a practical decision method, if a new moving average in the negative phase (the absolute value of the deceleration accumulation) each time continually increases in comparison with the last moving average, the processor 232 can decides that the bicycle 25 is in a state of a continual brake deceleration. This deceleration threshold value can be determined according to an amplitude magnitude of a periodic acceleration signal or a vibration signal different from the deceleration signal. For instance, the processor 232, based on at least one of the acceleration difference data signal K11 and the second acceleration average data signal U12, decides whether the moving device 22 or the bicycle 25 has a smooth braking, an emergency braking or an intermittent braking to occur.

Figure 9A:
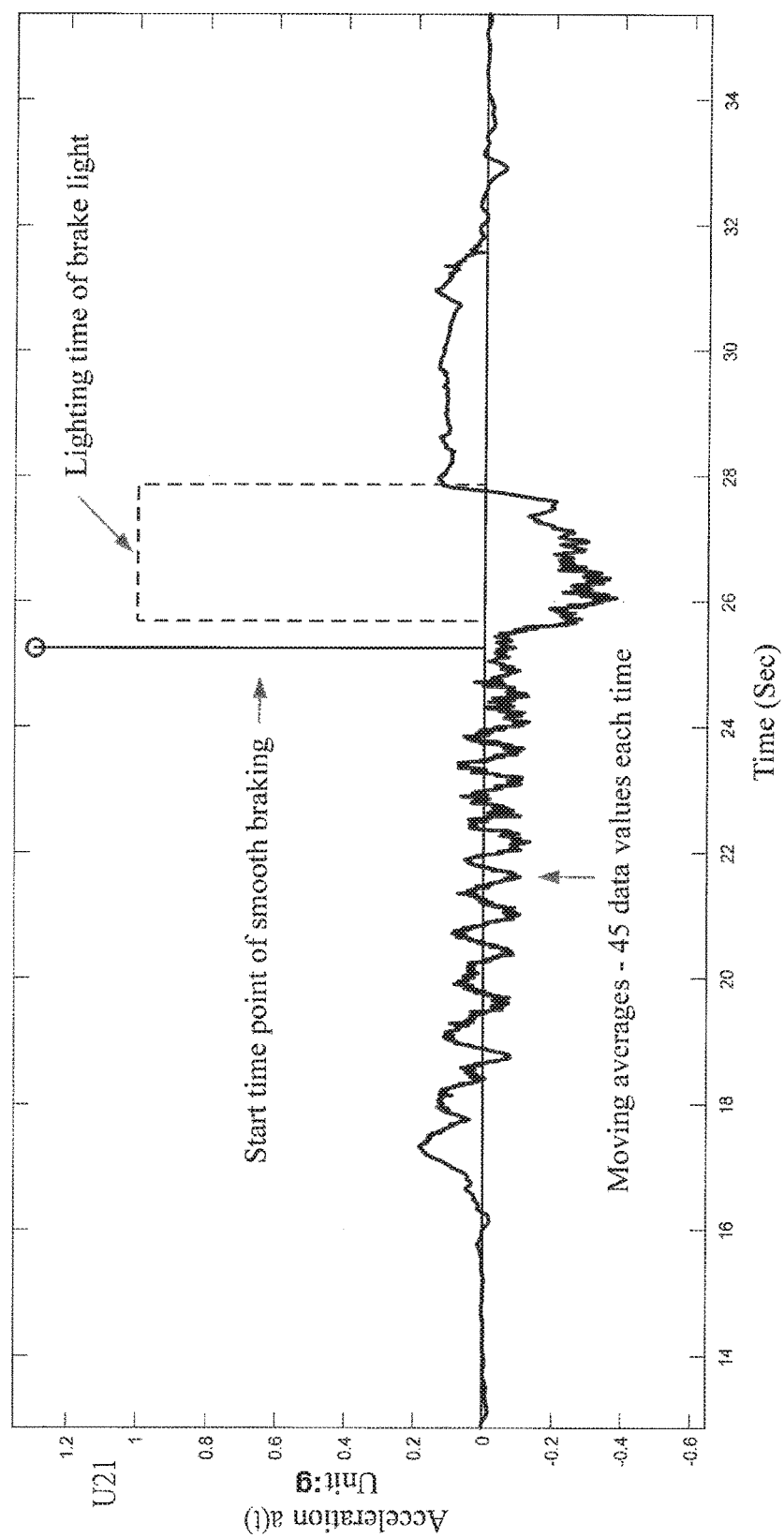
FIG. 9A is a representation diagram showing a first brake acceleration average data signal when a bicycle travels on a normal asphalt road surface.
Figure 9B:
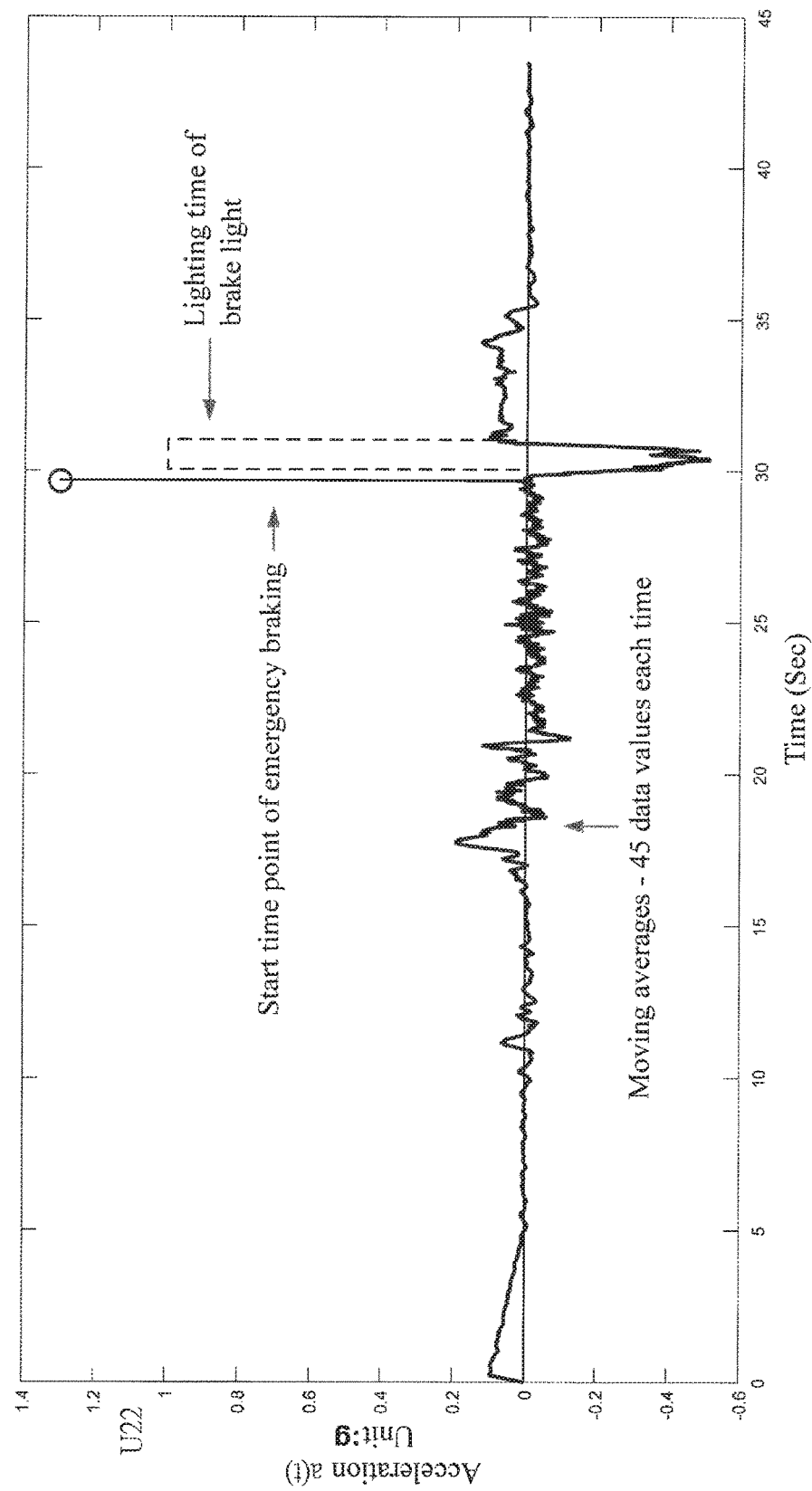
FIG. 9B is a representation diagram showing a second brake acceleration average data signal when the bicycle travels on a normal asphalt road surface.
Figure 9C:
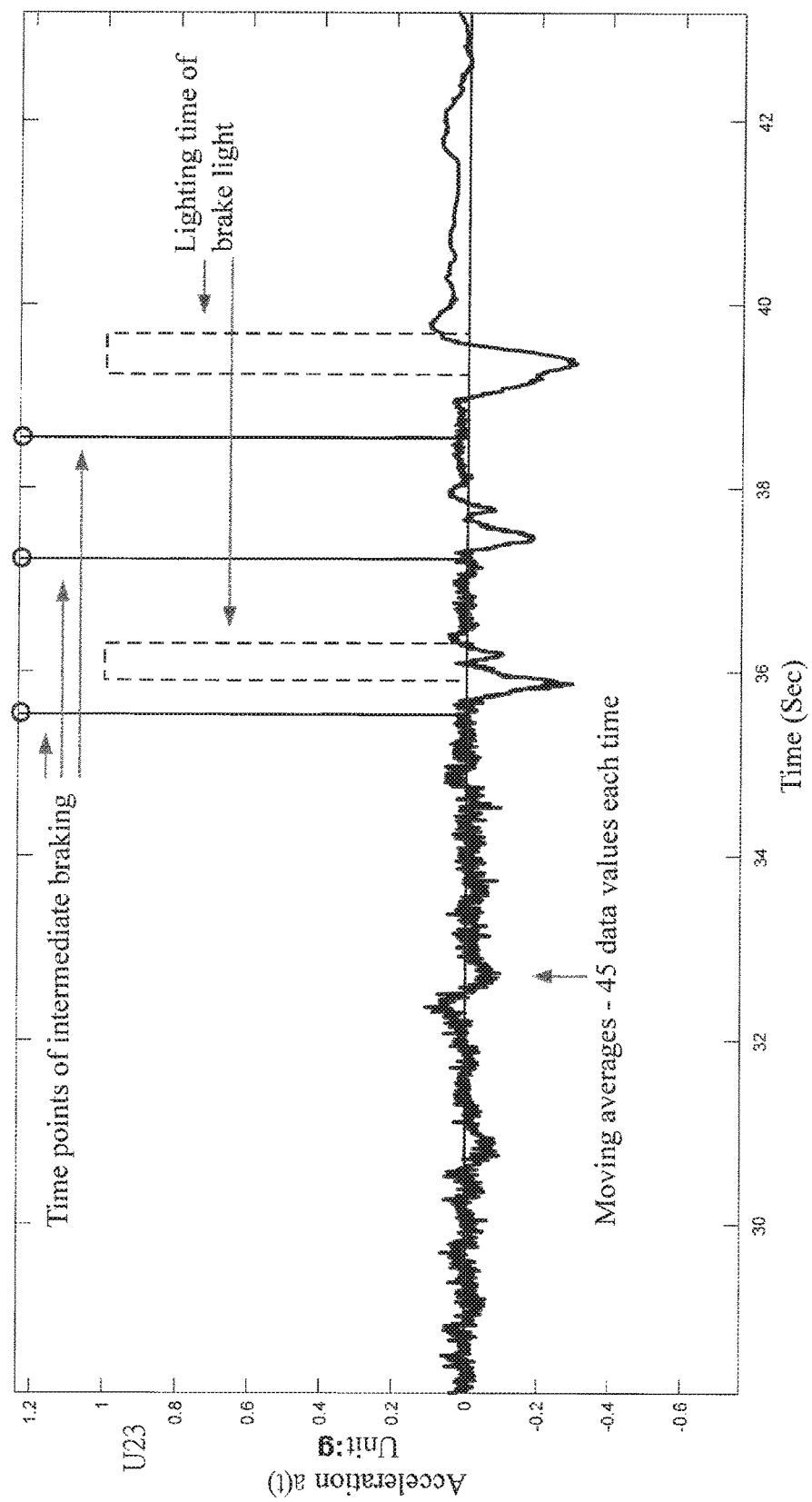
FIG. 9C is a representation diagram showing a third brake acceleration average data signal when the bicycle travels on a normal asphalt road surface.

Please refer to FIG. 9A, FIG. 9B and FIG. 9C. FIG. 9A is a representation diagram showing a first brake acceleration average data signal U21 when the bicycle 25 travels on a normal asphalt road surface. FIG. 9B is a representation diagram showing a second brake acceleration average data signal U22 when the bicycle 25 travels on a normal asphalt road surface. FIG. 9C is a representation diagram showing a third brake acceleration average data signal U23 when the bicycle 25 travels on a normal asphalt road surface.

The bicycle 25 has the following riding conditions to form the first brake acceleration average data signal U21 shown in FIG. 9A: a predetermined sample size of the moving average algorithm AM1 is equal to 45; a normal asphalt road surface; a riding speed is about equal to 10 Km/hr; and a smooth brake deceleration, i.e. deceleration values thereof have a relatively smaller variation, and have a wider distribution time, wherein the smooth brake deceleration has a relatively wider distribution time with respect to an operation time, and has a relatively smaller deceleration magnitude distribution. The bicycle 25 has the following riding conditions to form the second brake acceleration average data signal U22 shown in FIG. 9B: a predetermined sample size of the moving average algorithm AM1 is equal to 45; a normal asphalt road surface; a riding speed is about equal to 10 Km/hr; and an emergency brake deceleration or a rapid brake deceleration, i.e. deceleration values thereof have a relatively sharper variation, and have a narrower distribution time, wherein the emergency brake deceleration has a relatively very narrow distribution time with respect to an operation time, and has a very large deceleration magnitude distribution. The bicycle 25 has the following riding conditions to form the third brake acceleration average data signal U23 shown in FIG. 9C: a predetermined sample size of the moving average algorithm AM1 is equal to 45; a normal asphalt road surface; a riding speed is about equal to 10 Km/hr; and an intermittent brake deceleration, i.e. deceleration values thereof have an increasing-and-decreasing alternating distribution with respect to time, wherein the intermittent brake deceleration has several deceleration distributions corresponding to times of brake sub-operations with respect to an operation time.

In order to recognize a brake mode, the processor 232, based on a specific time interval or a moving average algorithm, dynamically performs an average operation to a data frame having, such as, 45 data values each time, and thereby accumulates deceleration values at different times. If an absolute value of the accumulated deceleration value is greater than a deceleration threshold value within the specific time interval, the processor 232 decides that a brake operation of the moving device 22 occurs. If a new moving average each time continually increases in comparison with the last moving average, the processor 232 can decides that the bicycle 25 is in a state of a continual brake deceleration. This deceleration threshold value can be determined according to an amplitude magnitude of a periodic acceleration signal or a vibration signal different from the deceleration signal. In order to recognize the brake mode, a weight factor can be introduced.

The processor 232, based on the moving average algorithm AM1, decides whether the moving device 22 or the bicycle 25 has a smooth braking to occur. The processor 232 generates new moving averages by applying a weight factor to a deceleration signal in the obtained acceleration average data signal, as shown in FIG. 9A, or without applying the weight factor thereto. If the new moving averages essentially vary in an increasing form according to a linear (first-order) equation, the processor 232 can decides that the brake operation EA1 of the moving device 22 forms a smooth braking.

The processor 232, based on the moving average algorithm AM1, decides whether the moving device 22 or the bicycle 25 has an emergency braking to occur. The processor 232 generates new moving averages by applying a weight factor to a deceleration signal in the obtained acceleration average data signal, as shown in FIG. 9B, or without applying the weight factor thereto. If the new moving averages essentially vary in an increasing form according to a curve (higher-degree) equation, the processor 232 can decides that the brake operation EA1 of the moving device 22 forms an emergency braking or a rapid braking.

The processor 232, based on the moving average algorithm AM1, decides whether the moving device 22 or the bicycle 25 has an intermittent braking to occur. The processor 232 generates new moving averages by applying a weight factor to a deceleration signal in the obtained acceleration average data signal, as shown in FIG. 9C, or without applying the weight factor thereto. If the new moving averages essentially vary according to a specific increasing tendency distribution with respect to time, the processor 232 can decides that the brake operation EA1 of the moving device 22 forms an intermittent braking.

In some embodiments, the processor 232, based on the acceleration difference data signal K11 as shown in FIG. 8, decides whether the brake deceleration magnitude and the deceleration time satisfy relevant threshold values in order to turn on the brake alert light. There are the following considerations when a deceleration-related calculation is performed based on the acceleration difference data signal K11.

For instance, a deceleration magnitude is calculated by calculating an integral area enclosed by a deceleration curve (or the acceleration difference data signal K11) and the zero-reference axis of acceleration (the abscissa of the x-coordinate), where the horizontal coordinate of the acceleration is zero. For instance, an increment/decrement of a count is used to analyze the deceleration curve (or the acceleration difference data signal K11) to determine a deceleration magnitude, wherein an increment of one count is configured to correspond to a unit deceleration value, and increments/decrements are accumulated to obtain the counts, which is used to represent a deceleration area formed by deceleration values less than zero. The scheme that an increment of the counts corresponding to a unit deceleration value is used to calculate the deceleration area has the following advantage. The counting scheme can be employed to easier perform a calculation by means of a computer program in comparison to a calculation method of performing an integration operation to the deceleration area.

For instance, the emergency braking, the smooth braking or the intermittent braking can be recognized with the help of different threshold values. That is to say, the accumulation operations used to calculate the counts for the emergency braking and the smooth braking can introduce different weight factors. For instance, a first weight factor used to an accumulation calculation for the emergency braking is greater than a second weight factor used to an accumulation calculation for the smooth braking. The advantages of such design are described as follows. In the condition of the emergency braking, employing a relatively large weight factor can more rapidly reflect the rate of change of the emergency braking in time, i.e. can definitely recognize a steeper deceleration signal distribution within a shorter time, thereby can recognize an emergency deceleration motion, and thereby can start the light alert corresponding to the emergency deceleration motion within a shorter time.

For instance, in order to avoid introducing noises, the processor 232 can provide a value capture threshold value when estimating a deceleration. For instance, when a magnitude or an absolute value of a moving-averaged deceleration data is equal to or greater than this value capture threshold value associated with the negative-phase deceleration, the processor 232 captures the absolute value to perform an accumulation calculation. For instance, the processor 232 performs a comparison between a first value and a second value to recognize the practical deceleration motion as a smooth deceleration motion, an emergency deceleration motion or an intermittent deceleration motion. The first value is an estimated integral area of the deceleration curve (or the acceleration difference data signal K11), or an accumulated value obtained by accumulating the increments/decrements associated with the deceleration. The second value is one selected from a group consisting of a third threshold value corresponding to the smooth deceleration motion, a fourth threshold value corresponding to the emergency deceleration motion, and a fifth threshold value corresponding to the intermittent deceleration motion.

Figure 10:
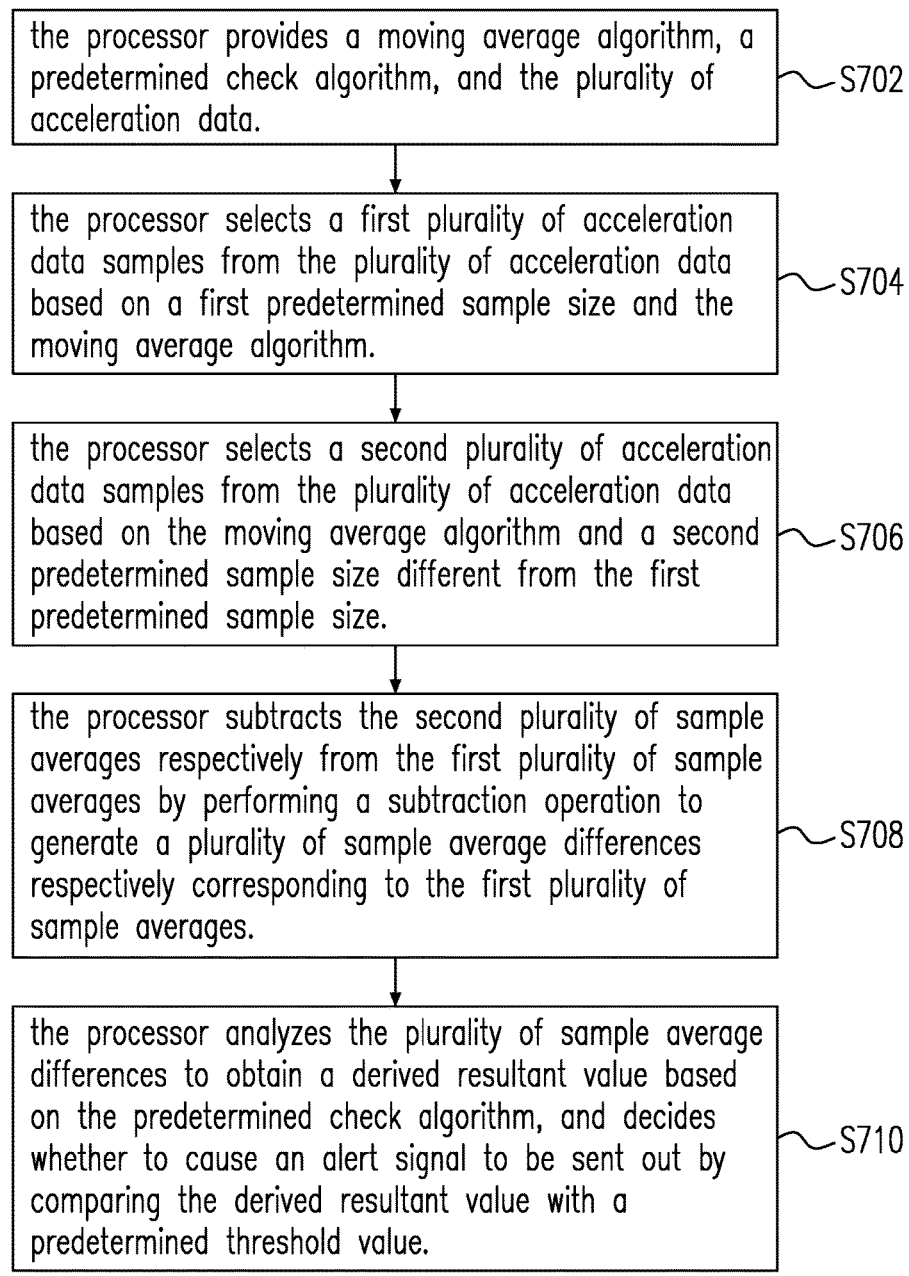
FIG. 10 is a data processing flow diagram showing a band-pass filtering simulation function according to various embodiments of the present disclosure.

Please refer to FIG. 10, which is a data processing flow diagram showing a band-pass filtering simulation function according to various embodiments of the present disclosure. In step S702, the processor 232 provides a moving average algorithm AM1, a predetermined check algorithm AE1, and the plurality of acceleration data D11, D12, D13, D14, . . . , D21, D22, D23, D24, . . . , D31, D32, D33, D34, . . . .

In step S704, the processor 232 selects a first plurality of acceleration data samples SD1, SD2, . . . from the plurality of acceleration data D11, D12, D13, D14, . . . , D21, D22, D23, D24, . . . , D31, D32, D33, D34, . . . based on a first predetermined sample size N11 and the moving average algorithm AM1, wherein each of the first plurality of acceleration data samples SD1, SD2, . . . has the first predetermined sample size N11. In step S704, the processor 232 further calculates a first plurality of sample averages AP1, AP2, . . . respectively associated with the first plurality of acceleration data samples SD1, SD2, . . . . Step S704 is used to implement a first low-pass filtering function having a relatively-high low-pass cut-off frequency FC2. For instance, the first predetermined sample size N11 is configured to correspond to a first predetermined data frame W11 moving on the plurality of acceleration data D11, D12, D13, D14, . . . , D21, D22, D23, D24, . . . , D31, D32, D33, D34, . . . .

The processor 232 performs a first low-pass filtering operation for the first low-pass filtering function by generating the first plurality of sample averages AP1, AP2, . . . . The first low-pass filtering operation is performed to mainly cause a relatively-high frequency acceleration/deceleration signal to pass. For instance, the first low-pass filtering operation filters out an acceleration disturbance signal, generated due to the road surface fluctuation, and causes an acceleration-and-deceleration signal, generated due to a pedal motion, and a deceleration signal, generated due to a brake operation, to pass.

In step S706, the processor 232 selects a second plurality of acceleration data samples SE1, SE2, . . . from the plurality of acceleration data D11, D12, D13, D14, . . . , D21, D22, D23, D24, . . . , D31, D32, D33, D34, . . . based on the moving average algorithm AM1 and a second predetermined sample size N12 different from the first predetermined sample size N11, wherein each of the second plurality of acceleration data samples SE1, SE2, . . . has the second predetermined sample size N12. In step S706, the processor 232 further calculates a second plurality of sample averages AQ1, AQ2, . . . respectively associated with the second plurality of acceleration data samples SE1, SE2, . . . . Step S706 is used to implement a second low-pass filtering function having a relatively-low low-pass cut-off frequency FC1. For instance, the second predetermined sample size N12 is configured to correspond to a second predetermined data frame W12 moving on the plurality of acceleration data D11, D12, D13, D14, . . . , D21, D22, D23, D24, . . . , D31, D32, D33, D34, . . . . The first and the second predetermined sample sizes N11 and N12 are respectively a relatively small sample size such as 50 data values, and a relatively large sample size such as 1000 data values, wherein the first and the second predetermined data frames W11 and W12 are respectively characterized by the first and the second predetermined sample sizes N11 and N12. The second plurality of acceleration data samples SE1, SE2, . . . may be configured to respectively correspond to the first plurality of acceleration data samples SD1, SD2, . . . .

The processor 232 performs a second low-pass filtering operation for the second low-pass filtering function by generating the second plurality of sample averages AQ1, AQ2, . . . . The second low-pass filtering operation filters out a relatively-high frequency disturbance signal (such as a vibration signal generated due to a motion that tires of the moving device 22 rolling on the road surface), and causes a relatively-low frequency acceleration-and-deceleration signal (such as including a relatively-low frequency signal generated due to the road surface fluctuation, and an intrinsic bias signal of the accelerometer 2311) to pass.

In step S708, the processor 232 subtracts the second plurality of sample averages AQ1, AQ2, . . . respectively from the first plurality of sample averages AP1, AP2, . . . by performing a subtraction operation to generate a plurality of sample average differences DG1, DG2, . . . respectively corresponding to the first plurality of sample averages AP1, AP2, . . . . Step S708 is used to implement a band-pass filtering function having a relatively-low band-pass cut-off frequency and a relatively-high band-pass cut-off frequency. The relatively-low band-pass cut-off frequency and the relatively-high band-pass cut-off frequency are respectively equal to the relatively-low low-pass cut-off frequency FC1 and the relatively-high low-pass cut-off frequency FC2. For instance, the plurality of sample average differences DG1, DG2, . . . are included in the acceleration difference data signal K11.

The processor 232 performs a band-pass filtering operation for the band-pass filtering function by generating the plurality of sample average differences DG1, DG2, . . . . For instance, the band-pass filtering function and the band-pass filtering operation are respectively a band-pass filtering simulation function and a band-pass filtering simulation operation. The first low-pass filtering operation generates a passed signal (including a brake deceleration signal and a pedal-related signal); the second low-pass filtering operation generates a relatively-low frequency signal due to an undulation and a fluctuation of a road surface; and the subtraction operation subtracts the relatively-low frequency signal from the passed signal. That is to say, the subtraction operation subtracts the bias of the deceleration signal, generated due to the undulation of the road or its surface fluctuation, and the intrinsic bias of the accelerometer 2311, and thereby causes a reference point of the deceleration signal and the pedal-related signal to be reset to that of a zero acceleration value.

The acceleration difference data signal K11 includes the brake deceleration signal and the pedal-related signal. Because each of the frequencies of the deceleration signal and the pedal-related signal, generated by the band-pass filtering simulation operation, is ranged at a scale about 1 Hz ($n \times 10^0$, $1 \le n \le 9$), it is necessary to further make a decision for distinguishing to cause the deceleration signal to be definitely compared. Differences between the brake deceleration signal and the pedal-related signal are described as follows. The pedal-related signal is a periodic signal, which represents a motion having a first acceleration greater than zero and a second acceleration less than zero; i.e. this periodic acceleration-and-deceleration motion results in the acceleration signal having two different polarities. The brake deceleration can only has an acceleration less than zero, and thus results in a deceleration signal.

In step S710, the processor 232 analyzes the plurality of sample average differences DG1, DG2, . . . to obtain a derived resultant value VA1 based on the predetermined check algorithm AE1, and decides whether to cause an alert signal Q1 to be sent out by comparing the derived resultant value VA1 with a predetermined threshold value VT11.

The predetermined check algorithm AE1 is employed to the acceleration values less than zero, and includes one selected from a group consisting of an area algorithm, a counting algorithm and a weight algorithm. The area algorithm is employed to accumulate acceleration/deceleration values, and is employed to decide whether the moving device 22 has a brake deceleration to occur. The processor 232 can employ the predetermined check algorithm AE1 to eliminate the intrinsic bias of the accelerometer 2311, or the gravitational acceleration bias generated due to the undulation of the road or the road surface fluctuation along the road. For instance, the motion M1 of the moving device 22 has a variable acceleration B1; and the processor 232, based on the acceleration difference data signal K11, makes a decision R1 whether the variable acceleration B1 is equal to a designated deceleration to occur, wherein the designated deceleration is the brake deceleration.

The counting algorithm is employed to accumulate a count to represent the accumulated deceleration values, and is employed to decide whether the moving device 22 has a brake deceleration to occur. In order to avoid selecting a disturbance value, the counting algorithm is performed to decide whether a candidate value in the plurality of sample average differences DG1, DG2, . . . is selected according to a predetermined value capture threshold value. For instance, the predetermined value capture threshold value is equal to −0.1, so that a first value range between zero and −0.1 is regarded as a signal disturbance range, and a second value range less than −0.1 is regarded as a value referral range. When the candidate value is within the signal disturbance range, the processor 232 does not increase/decrease the count for the counting algorithm. When the candidate value is within the value referral range, the processor 232 increases the count with an increment. For instance, the processor 232 avoids selecting a disturbance value by comparing the candidate value with the predetermined value capture threshold value. The weight algorithm applies a weight factor to the area algorithm or the counting algorithm when the processor 232 decides that the brake deceleration is happened in which one of different brake modes, thereby speeding up to determine a comparison result.

In some embodiments, when the processor 232 makes a decision to tell a brake mode of the moving device 22, the processor 232 employs a predetermined threshold value VT21. In order to determine a brake mode (a smooth brake mode, an emergency brake mode or an intermittent brake mode) of the moving device 22, the processor 232 obtains the predetermined threshold value VT21 (a brake mode threshold value) and an accumulated deceleration value or an accumulated cont determined for a specific time interval of the plurality of sample average differences DG1, DG2, . . . based on the area algorithm or the counting algorithm, and compares the predetermined threshold value VT21 with the accumulated deceleration value or the accumulated count to decide the brake mode. In some embodiments, regarding a start of turning on a deceleration alert light, the processor 232 determines deceleration threshold values respectively corresponding to different brake modes beforehand, and compares the accumulated deceleration value or the accumulated count with a corresponding deceleration threshold value of a corresponding brake mode to decide whether a deceleration light alert shall be sent out.

A technical scheme in the prior art only employs a single low-pass filtering. Under a condition that if the second low-pass filtering operation is only performed, the relatively-low frequency signal (similar to a bias signal of an accelerometer) passed by the second low-pass filtering operation can influence a zero reference point thereof, so that subsequently when the acceleration/deceleration values are accumulated to obtain a speed value, the obtained speed value has a significant error, wherein the relatively-low frequency signal is generated due to the road undulation or the road surface fluctuation. In addition, the second low-pass filtering operation can filter out the relatively-high frequency disturbance signal, can further make an aliasing twist to the deceleration signal or filter out the deceleration signal, and thereby influencing the subsequent brake deceleration decision. Under a condition that the first low-pass filtering operation is only performed to process a raw deceleration signal of a bicycle, although the pedal-related signal and the brake deceleration signal can be output, the relatively-low frequency signal generated due to the road undulation or the road surface fluctuation still influences the zero reference point.

Therefore, the quasi-band-pass filtering function described in the present disclosure has the following consideration points. The first and the second low-pass filtering operation are simultaneously used to output the desired deceleration signal, wherein the second low-pass filtering operation is used to determine a relatively-low frequency signal component in the acceleration-and-deceleration signal which can result in an estimation error; and the first low-pass filtering operation is used to output the sought relatively-high frequency acceleration-and-deceleration signal component. In addition, the quasi-band-pass filtering operation for the quasi-band-pass filtering function subtracts the relatively-low frequency signal component from the relatively-high frequency acceleration-and-deceleration signal component to generate the desired estimated deceleration signal.

Figure 11:
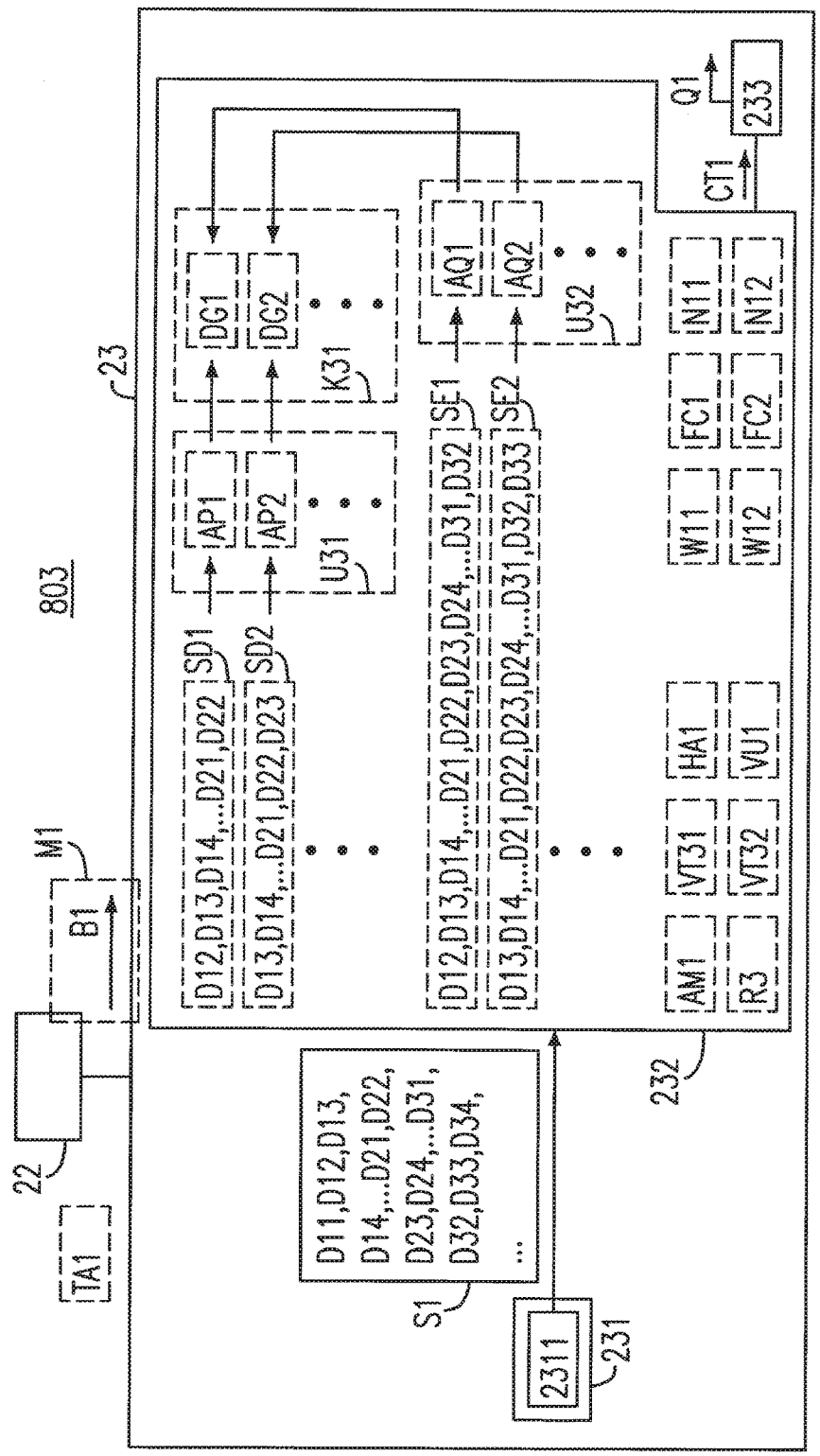
FIG. 11 is a schematic diagram showing a motion system according to various embodiments of the present disclosure.
Figure 12:
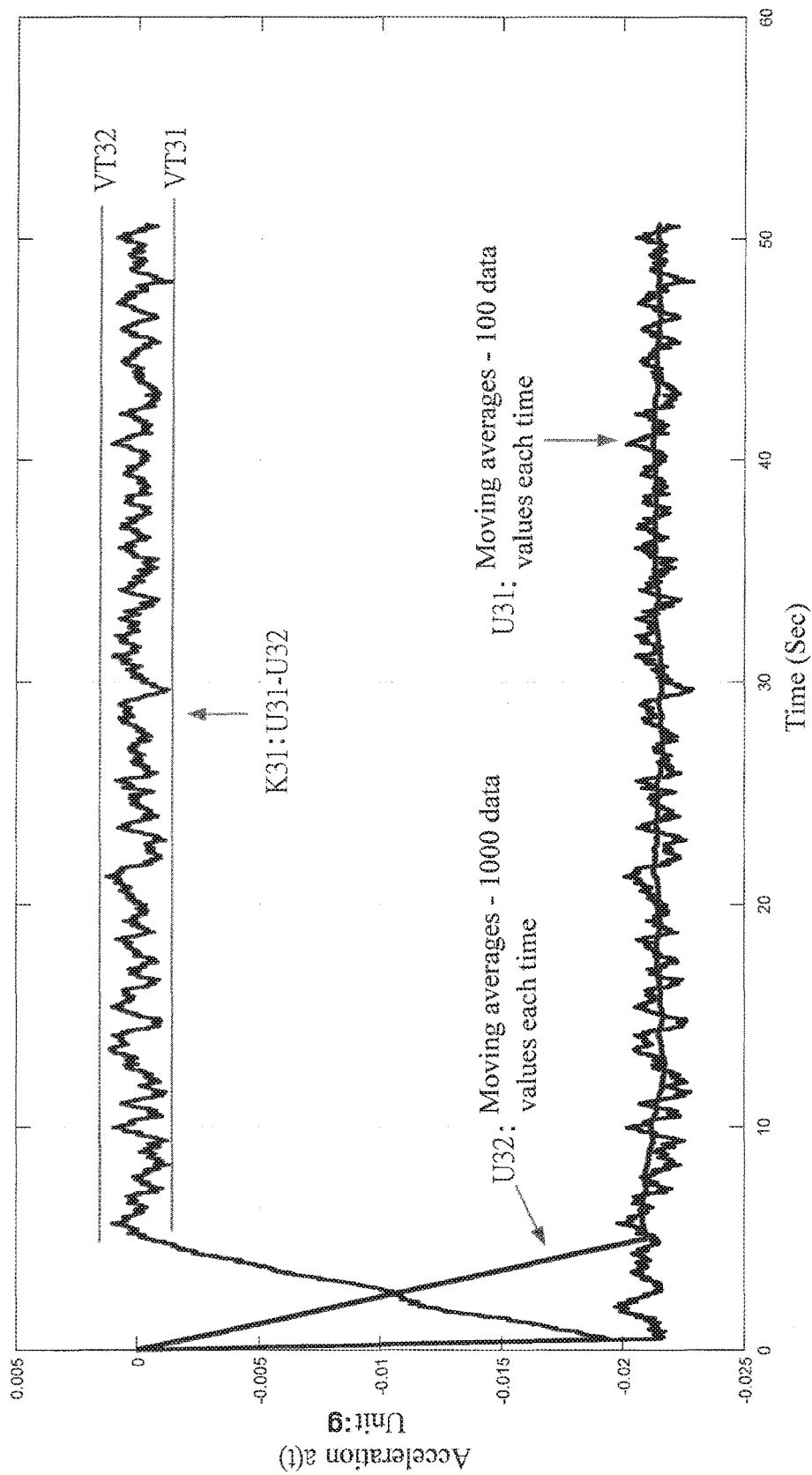
FIG. 12 is a relation diagram showing a fourth acceleration average data signal, a fifth acceleration average data signal, and an acceleration difference data signal between the fourth and the fifth acceleration average data signals associated with the motion system shown in FIG. 11.

Please refer to FIG. 11 and FIG. 12. FIG. 11 is a schematic diagram showing a motion system 803 according to various embodiments of the present disclosure. FIG. 12 is a relation diagram showing a fourth acceleration average data signal U31, a fifth acceleration average data signal U32, and an acceleration difference data signal K31 between the fourth and the fifth acceleration average data signals U31 and U32 associated with the motion system 803 shown in FIG. 11. The motion system 803 shown in FIG. 11 has structures and functions similar to those shown in FIG. 3.

As shown in FIGS. 11 and 12, the acceleration variation diagram of the fourth acceleration average data signal U31 is a result that the collected acceleration sense signal S1 is processed according to a plurality of average operations and a first predetermined data frame W11 containing 100 variable data values (the first predetermined sample size N11), wherein the fourth acceleration average data signal U31 represents an estimated acceleration distribution with respect to a time, and an average operation is performed to the first predetermined data frame W11 in response to moving the first predetermined data frame W11 on the collected acceleration sense signal S1 each time. For instance, the processor 232 selects a first plurality of acceleration data samples SD1, SD2, . . . from the plurality of acceleration data D11, D12, D13, D14, . . . , D21, D22, D23, D24, . . . , D31, D32, D33, D34, . . . based on the first predetermined sample size N11 (or the first predetermined data frame W11) and the moving average algorithm AM1, wherein each of the first plurality of acceleration data samples SD1, SD2, . . . has the first predetermined sample size N11 equal to 100. The processor 232 further calculates a first plurality of sample averages AP1, AP2, . . . respectively associated with the first plurality of acceleration data samples SD1, SD2, . . . to form the fourth acceleration average data signal U31. The processor 232 performs a first low-pass filtering operation having a relatively-high low-pass cut-off frequency FC2 by calculating the first plurality of sample averages AP1, AP2, . . . . . The first low-pass filtering operation performs a relatively-intermediate-and-high frequency filtering operation to output an acceleration signal having a relatively wide frequency range including relatively low, intermediate and high frequencies, wherein the acceleration signal is correspondingly generated due to various body motions of the bicycle 25 and a fluctuation, an undulation or an inclination of the road surface.

The acceleration variation diagram of the fifth acceleration average data signal U32 is a result that the collected acceleration sense signal S1 is processed according to a plurality of average operations and a second predetermined data frame W12 containing 1000 variable data values (the second predetermined sample size N12), wherein the fifth acceleration average data signal U32 represents an estimated acceleration distribution with respect to a time, and an average operation is performed to the second predetermined data frame W12 in response to moving the second predetermined data frame W12 on the collected acceleration sense signal S1 each time. For instance, the processor 232 selects a second plurality of acceleration data samples SE1, SE2, . . . from the plurality of acceleration data D11, D12, D13, D14, . . . , D21, D22, D23, D24, . . . , D31, D32, D33, D34, . . . based on the moving average algorithm AM1 and the second predetermined sample size N12 (or the second predetermined data frame W12) different from the first predetermined sample size N11, wherein each of the second plurality of acceleration data samples SE1, SE2, . . . has the second predetermined sample size N12 equal to 1000. The processor 232 further calculates a second plurality of sample averages AQ1, AQ2, . . . respectively associated with the second plurality of acceleration data samples SE1, SE2, . . . to form the fifth acceleration average data signal U32. The processor 232 performs a second low-pass filtering operation having a relatively-low low-pass cut-off frequency FC1 by calculating the second plurality of sample averages AQ1, AQ2, . . . . The second low-pass filtering operation performs a relatively-low frequency filtering operation to output an acceleration signal having a frequency range including relatively-low frequencies, wherein the acceleration signal is correspondingly generated due to various body motions of the bicycle 25 and a fluctuation, an undulation or an inclination of the road surface.

The processor 232 subtracts the fifth acceleration average data signal U32 from the fourth acceleration average data signal U31 to obtain the acceleration difference data signal K31 as shown in FIG. 12 by performing a subtraction operation. The subtraction operation eliminates a gravity variation signal generated due to the road surface fluctuation, undulation or inclination, and thereby causes the acceleration difference data signal K31 to mainly include an acceleration signal generated due to the motion of the moving device 22. The subtraction operation can avoid that a gravitational acceleration variation signal generated due to the road inclination is misjudged to be an acceleration signal generated due to the motion of the moving device 22. For instance, the processor 232 respectively subtracts the second plurality of sample averages AQ1, AQ2, . . . from the first plurality of sample averages AP1, AP2, . . . to obtain a plurality of sample average differences DG1, DG2, . . . respectively corresponding to the first plurality of sample averages AP1, AP2, . . . . For instance, the plurality of sample average differences DG1, DG2, . . . are included in the acceleration difference data signal K31.

The processor 232 provides a first predetermined threshold value VT31 and a second predetermined threshold value VT32 as shown in FIG. 12. The processor 232 makes a decision R3 to decide whether the alert device 23 is in a static state based on the first and the second predetermined threshold values VT31 and VT32. The first and the second predetermined threshold values VT31 and VT32 are configured to represent a specific acceleration range covering a positive side and a negative side with respect to the zero acceleration. The processor 232 obtains an analysis result HA1 by analyzing a plurality of recent sample average differences included in the acceleration difference data signal K31. The processor 232 makes the decision R3 based on the analysis result HA1.

When the analysis result HA1 indicates that each of the plurality of recent sample average differences obtained within a designated last duration TA1 is within a predetermined threshold value range VU1 between the first and the second predetermined threshold values VT31 and VT32, the decision R3 is positive, so that the processor 232 decides that the alert device 23 is in the static state. When the analysis result HA1 indicates that at least one of the plurality of recent average sample average differences obtained within a designated last duration TA1 is outside of the predetermined threshold value range VU1, the decision R3 is negative, so that the processor 232 decides that the alert device 23 is in a moving state. When the decision R3 is positive, the processor 232 causes the alert device 23 to be in a power saving state to operate in a sleep mode. For instance, the designated last duration TA1 is equal to 20 seconds.

Under a condition that the moving device 22 or the alert device 23 is in the static state, however, when the processor 232, based on the abovementioned sense and decision flow, decides that the alert device 23 is in the moving state, the processor 232 causes the alert device 23 to exit the sleep mode to enter a normal operation mode.

The decision flow for the static state is similar to that for the brake deceleration. In addition to two moving average operation and the subtraction operation, which are used to perform the quasi-band-pass filtering function, the operation method applied to static-state decision is also similar to that applied to the brake deceleration decision, wherein the operation method is employed to process the signal output by the quasi-band-pass filtering operation. The difference between the two operation methods is only that motion contents or states to be decided are different; i.e. a decision whether the brake deceleration happens, or a decision whether to be in the static state.

Figure 13:
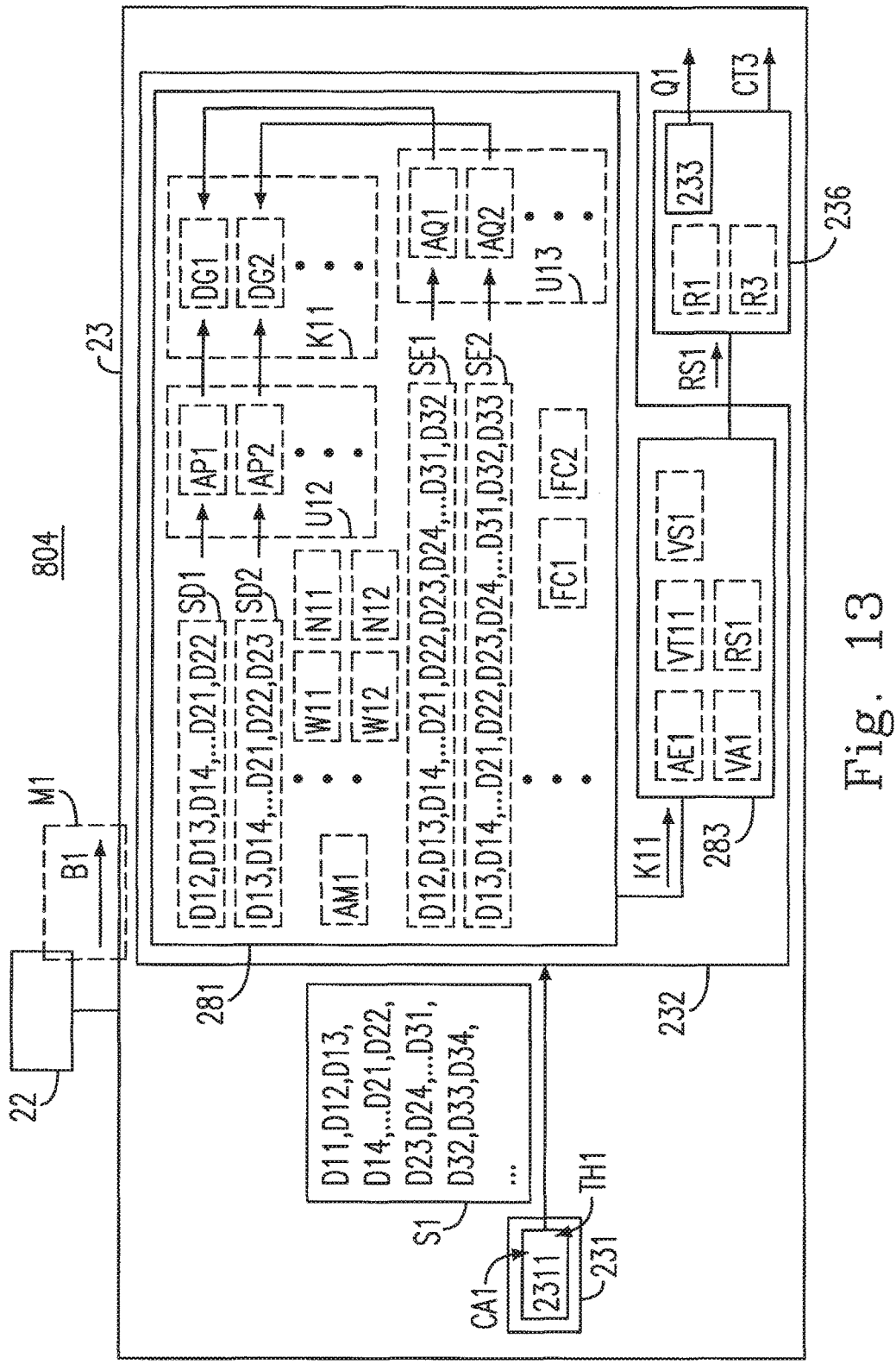
FIG. 13 is a schematic diagram showing a motion system according to various embodiments of the present disclosure.

Please refer to FIG. 13, which is a schematic diagram showing a motion system 804 according to various embodiments of the present disclosure. As shown in FIG. 13, the motion system 804 includes a moving device 22, and an alert device 23 coupled to the moving device 22. In some embodiments, the alert device 23 of the moving device 22 has a variable acceleration B1, and includes a sensing unit 231, a processor 232 coupled to the sensing unit 231, and an alert unit 233 coupled to the processor 232. The sensing unit 231 includes an accelerometer 2311, and senses the variable acceleration B1 to generate a plurality of acceleration data D11, D12, D13, D14, . . . , D21, D22, D23, D24, . . . , D31, D32, D33, D34, . . . . For instance, the plurality of acceleration data D11, D12, D13, D14, . . . , D21, D22, D23, D24, . . . , D31, D32, D33, D34, . . . are respectively a plurality of acceleration values. For instance, the accelerometer 2311 senses the variable acceleration B1 to generate the plurality of acceleration data D11, D12, D13, D14, . . . , D21, D22, D23, D24, . . . , D31, D32, D33, D34, . . . .

The processor 232 employs a moving average algorithm AM1, selects a first plurality of acceleration data samples SD1, SD2, . . . and a second plurality of acceleration data samples SE1, SE2, . . . respectively corresponding to two different predetermined sample sizes (such as N11 and N12, or two different predetermined data frames W11 and W12) from the plurality of acceleration data D11, D12, D13, D14, . . . , D21, D22, D23, D24, . . . , D31, D32, D33, D34, . . . based on the two different predetermined sample sizes (such as N11 and N12) and the moving average algorithm AM1 to correspondingly calculate a first plurality of sample averages AP1, AP2, . . . and a second plurality of sample averages AQ1, AQ2, . . . , and obtains a plurality of sample average differences DG1, DG2, . . . between the first and the second pluralities of sample averages AP1, AP2, . . . and AQ1, AQ2, . . . . The processor 232 analyzes the plurality of sample average differences DG1, DG2, . . . based on a predetermined check algorithm AE1 to obtain a derived resultant value VA1, and performs a data comparison between the derived resultant value VA1 and a predetermined threshold value VT11 to generate a comparison result RS1.

In some embodiments, the alert device 23 includes the sensing unit 231, a data processing unit 281 coupled to the sensing unit 231, and a data analysis unit 283 coupled to the data processing unit 281. The data processing unit 281 employs the moving average algorithm AM1. For instance, each of the data processing unit 281 and the data analysis unit 283 is constructed by the processor 232.

The data processing unit 281 determines a first plurality of acceleration data samples SD1, SD2, . . . and a second plurality of acceleration data samples SE1, SE2, . . . respectively corresponding to two different predetermined sample sizes (such as N11 and N12) from the plurality of acceleration data D11, D12, D13, D14, . . . , D21, D22, D23, D24, . . . , D31, D32, D33, D34, . . . based on the moving average algorithm AM1 to correspondingly calculate a first plurality of sample averages AP1, AP2, . . . and a second plurality of sample averages AQ1, AQ2, . . . , and obtains a plurality of sample average differences DG1, DG2, . . . between the first and the second pluralities of sample averages AP1, AP2, . . . and AQ1, AQ2, . . . . The data analysis unit 283 analyzes the plurality of sample average differences DG1, DG2, . . . based on a predetermined check algorithm AE1 to obtain a derived resultant value VA1, and performs a data comparison between the derived resultant value VA1 and a predetermined threshold value VT11 to generate a comparison result RS1.

In some embodiments, the data comparison compares a magnitude of the derived resultant value VA1 with that of the predetermined threshold value VT11. The alert device 23 further includes a control unit 236. The control unit 236 is coupled to the processor 232 or the data analysis unit 283, and generates one of an alert signal Q1 and a control signal CT3 according to the comparison result RS1. The control signal CT3 is used to switch the alert device 23 to operate in one of an operating mode and a power-saving mode. For instance, the control unit 236 decides whether to send out the alert signal Q1 according to the comparison result RS1, and thus makes a decision R1. When the decision R1 is positive, the control unit 236 generates the alert signal Q1. For instance, the control unit 236 decides whether to send out the control signal CT3 according to the comparison result RS1, and thus makes a decision R3. When the decision R3 is positive, the control unit 236 generates the control signal CT3. For instance, the control unit 236 includes an alert unit 233; and when the decision R1 is positive, the control unit 236 uses the alert unit 233 to generate the alert signal Q1.

In some embodiments, the data processing unit 281 serves as a quasi-band-pass filter. The sensing unit 231 senses the variable acceleration B1 according to a predetermined sampling frequency CA1, and sends the plurality of acceleration data D11, D12, D13, D14, . . . , D21, D22, D23, D24, . . . , D31, D32, D33, D34, . . . according to a predetermined transmission frequency TH1. A first signal formed by the first plurality of sample averages AP1, AP2, . . . and a second signal formed by the second plurality of sample averages AQ1, AQ2, . . . respectively have a first frequency range and a second frequency range; and a third signal formed by the plurality of sample average differences DG1, DG2, . . . has a selected frequency range. For instance, the two different predetermined sample sizes (such as N11 and N12) are determined beforehand, so that the selected frequency range is satisfactory to decide whether the variable acceleration B1 is equal to a designated deceleration to occur, wherein the designated deceleration is a brake deceleration.

The predetermined check algorithm AE1 has one of a count algorithm and an area algorithm, and is employed to analyze the plurality of sample average differences DG1, DG2, . . . to obtain the derived resultant value VA1. The motion analysis unit 283 selects a plurality of ones DH1, DH2, . . . from the plurality of sample average differences DG1, DG2, . . . based on a sampling threshold value VS1. The motion analysis unit 283 analyzes the selected plurality of sample average differences DH1, DH2, . . . to generate the comparison result RS1 based on the predetermined check algorithm AE1. For instance, the sampling threshold value VS1 is used to identify the signal error band.

Please refer to FIG. 13. An alert method for a moving device 22 having a motion M1 is disclosed, and includes the following steps. A moving average algorithm AM1 is provided. A plurality of acceleration data D11, D12, D13, D14, . . . , D21, D22, D23, D24, . . . , D31, D32, D33, D34, . . . is obtained by sensing the motion M1. Based on two different predetermined sample sizes (such as N11 and N12, or two different predetermined data frames W11 and W12) and the moving average algorithm AM1, a first plurality of acceleration data samples SD1, SD2, . . . and a second plurality of acceleration data samples SE1, SE2, . . . respectively corresponding to the two different predetermined sample sizes (such as N11 and N12) are determined from the plurality of acceleration data D11, D12, D13, D14, . . . , D21, D22, D23, D24, . . . , D31, D32, D33, D34, . . . to correspondingly calculate a first plurality of sample averages AP1, AP2, . . . and a second plurality of sample averages AQ1, AQ2, . . . . A plurality of sample average differences DG1, DG2, . . . between the first and the second pluralities of sample averages AP1, AP2, . . . and AQ1, AQ2, . . . are obtained. The plurality of sample average differences DG1, DG2, . . . are analyzed based on a predetermined check algorithm AE1 to obtain a derived resultant value VA1. A data comparison between the derived resultant value VA1 and a predetermined threshold value VT11 is performed to generate a comparison result RS1.

In some embodiments, the data comparison compares a magnitude of the derived resultant value VA1 with that of the predetermined threshold value VT11. The alert method further includes the following steps: one of an alert signal Q1 and a control signal CT3 is generated according to the comparison result RS1; the alert method is switched to operate in one of an operating mode and a power-saving mode in response to the control signal CT3 when the control signal CT3 is generated; and the plurality of acceleration data D11, D12, D13, D14, . . . , D21, D22, D23, D24, . . . , D31, D32, D33, D34, . . . is sent according to a predetermined transmission frequency CA1, wherein the motion M1 is sensed to generate the plurality of acceleration data D11, D12, D13, D14, . . . , D21, D22, D23, D24, . . . , D31, D32, D33, D34, . . . according to a predetermined sampling frequency TH1. A first signal formed by the first plurality of sample averages AP1, AP2, . . . and a second signal formed by the second plurality of sample averages AQ1, AQ2, . . . respectively have a first frequency range and a second frequency range; and a third signal formed by the plurality of sample average differences DG1, DG2, . . . has a selected frequency range. For instance, the two different predetermined sample sizes (such as N11 and N12) are determined beforehand, so that the selected frequency range is satisfactory to decide whether the motion M1 has a designated deceleration to occur, wherein the designated deceleration is a brake deceleration.

Figure 14:
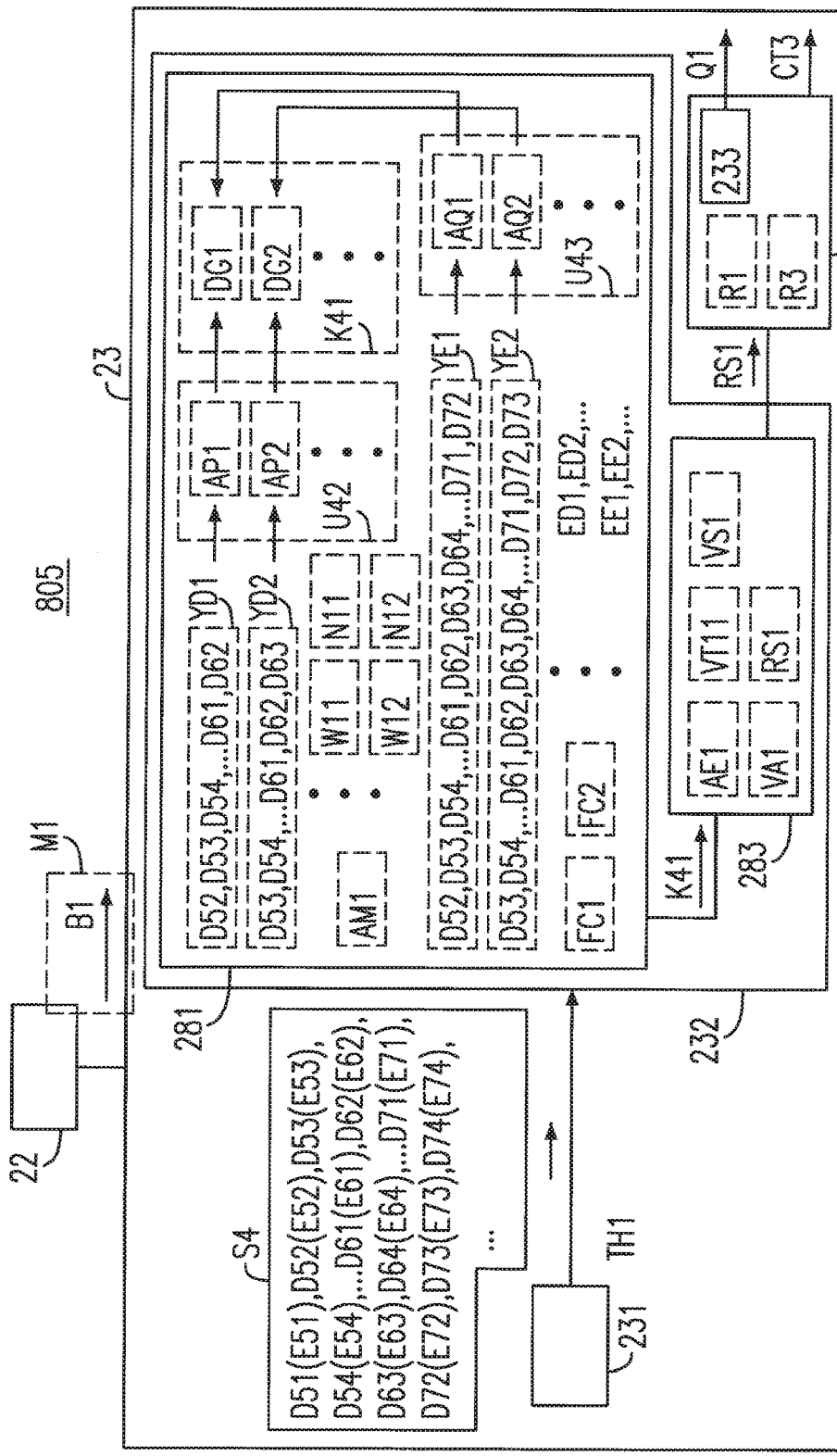
FIG. 14 is a schematic diagram showing a motion system according to various embodiments of the present disclosure.

Please refer to FIG. 14, which is a schematic diagram showing a motion system 805 according to various embodiments of the present disclosure. As shown in FIG. 14, the motion system 805 includes a moving device 22, and an alert device 23 coupled to the moving device 22. In some embodiments, an alert method for a moving device 22 having a motion M1 is performed in the alert device 23.

In some embodiments, the alert method includes the following steps. A moving average algorithm AM1 is provided. A plurality of motion data D51, D52, D53, D54, . . . , D61, D62, D63, D64, . . . , D71, D72, D73, D74, . . . having a first plurality of data contents ED1, ED2, . . . and a second plurality of data contents EE1, EE2, . . . are generated in response to the motion M1. A first predetermined data frame W11 and a second predetermined data frame W12 respectively associated with the first and the second plurality of data contents ED1, ED2, . . . and EE1, EE2, . . . are selected. Based on the first and the second predetermined data frames W11 and W12 and the moving average algorithm AM1, a first plurality of motion data samples YD1, YD2, . . . and a second plurality of motion data samples YE1, YE2, . . . respectively corresponding to the first and the second predetermined data frames W11 and W12 are selected from the plurality of motion data D51, D52, D53, D54, . . . , D61, D62, D63, D64, . . . , D71, D72, D73, D74, . . . to correspondingly calculate a first plurality of sample averages AP1, AP2, . . . and a second plurality of sample averages AQ1, AQ2, . . . . . A plurality of sample average differences DG1, DG2, . . . between the first and the second pluralities of sample averages AP1, AP2, . . . and AQ1, AQ2, . . . are analyzed to obtain an analysis result.

In some embodiments, the plurality of sample average differences DG1, DG2, . . . is analyzed based on a predetermined check algorithm AE1 to obtain the analysis result, wherein the analysis result is a derived resultant value VA1. The alert method further includes that a data comparison between the analysis result and a predetermined threshold value VT11 is performed to generate a comparison result RS1. The plurality of motion data D51, D52, D53, D54, . . . , D61, D62, D63, D64, . . . , D71, D72, D73, D74, . . . are or have a plurality of data contents E51, E52, E53, E54, . . . , E61, E62, E63, E64, . . . , E71, E72, E73, E74, . . . , respectively. The plurality of motion data D51, D52, D53, D54, . . . , D61, D62, D63, D64, . . . , D71, D72, D73, D74, . . . are those selected from a group consisting of a plurality of acceleration data, a plurality of speed data, a plurality of displacement data, and a combination thereof. The first and the second plurality of data contents ED1, ED2, . . . and EE1, EE2, . . . are configured to respectively represent a first acceleration having a first frequency, and a second acceleration having a second frequency. The first and the second predetermined data frames W11 and W12 are respectively characterized by a first predetermined sample size N11 and a second predetermined sample size N12.

For instance, the alert device 23 includes a sensing unit 231, a processor 232 coupled to the sensing unit 231, and an alert unit 233 coupled to the processor 232. The sensing unit 231 senses the motion M1 to output a motion parameter sense signal S4. The motion parameter sense signal S4 includes the plurality of motion data D51, D52, D53, D54, . . . , D61, D62, D63, D64, . . . , D71, D72, D73, D74, . . . . The first plurality of sample averages AP1, AP2, . . . . forms a first motion parameter average data signal U42. The second plurality of sample averages AQ1, AQ2, . . . forms a second motion parameter average data signal U43. The plurality of sample average differences DG1, DG2, . . . forms a motion parameter difference data signal K41. For instance, the plurality of motion data D51, D52, D53, D54, . . . , D61, D62, D63, D64, . . . , D71, D72, D73, D74, . . . are respectively a plurality of motion parameter data, or respectively have a plurality of motion parameter values.

While the invention has been described in terms of what is presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. An alert device for a moving device having a variable acceleration, the alert device comprising:
   a sensing unit including an accelerometer, and sensing the variable acceleration to generate a plurality of acceleration data;
   a data processing unit employing a moving average algorithm, determining a first plurality of acceleration data samples and a second plurality of acceleration data samples respectively corresponding to two different predetermined sample sizes from the plurality of acceleration data based on the moving average algorithm to calculate a first plurality of sample averages similar to a second-low pass filter associated with a plurality of deceleration data, a plurality of pedal acceleration data, a plurality of acceleration errors and a second plurality of sample averages similar to a first-low pass filter associated with the plurality of acceleration errors, and as serving as a band-pass filtering function to obtain a plurality of sample average differences between the first and the second pluralities of sample averages, so as to eliminate the plurality of acceleration errors and reveal the plurality of deceleration data and the plurality of pedal acceleration data; and
   a motion analysis unit analyzing the plurality of sample average differences based on a predetermined check algorithm to distinguish the plurality of pedal acceleration data and obtain a derived resultant value, and performing a data comparison between the derived resultant value and a predetermined threshold value to generate a comparison result.

2. The alert device according to claim 1, wherein the data comparison compares a magnitude of the derived resultant value with that of the predetermined threshold value.

3. The alert device according to claim 1, further comprising a control unit generating one of an alert signal and a control signal according to the comparison result.

4. The alert device according to claim 3, wherein the control signal is used to switch the alert device to operate in one of an operating mode and a power-saving mode.

5. The alert device according to claim 1, wherein the data processing unit serves as a quasi-band-pass filter.

6. The alert device according to claim 1, wherein the sensing unit senses the variable acceleration according to a predetermined sampling frequency, and sends the plurality of acceleration data according to a predetermined transmission frequency.

7. The alert device according to claim 1, wherein:
   a first signal formed by the first plurality of sample averages and a second signal formed by the second plurality of sample averages respectively have a first frequency range and a second frequency range; and
a third signal formed by the plurality of sample average differences has a selected frequency range.

8. The alert device according to claim 1, wherein the predetermined check algorithm has one of a count algorithm and an area algorithm, and is employed to analyze the plurality of sample average differences to obtain the derived resultant value.

9. The alert device according to claim 1, wherein:
the motion analysis unit selects a plurality of ones from the plurality of sample average differences based on a sampling threshold value; and
the motion analysis unit analyzes the selected plurality of sample average differences to generate the comparison result based on the predetermined check algorithm.

10. An alert method for a moving device having a motion, the alert method comprising steps of:
providing a moving average algorithm;
obtaining a plurality of acceleration data by sensing the motion;
based on two different predetermined sample sizes and the moving average algorithm, determining a first plurality of acceleration data samples and a second plurality of acceleration data samples respectively corresponding to the two different predetermined sample sizes from the plurality of acceleration data to calculate a first plurality of sample averages associated with a plurality of deceleration data, a plurality of pedal acceleration data, a plurality of acceleration errors and a second plurality of sample averages associated with the plurality of acceleration errors;
obtaining a plurality of sample average differences between the first and the second pluralities of sample averages, so as to eliminate the plurality of acceleration errors and reveal the plurality of deceleration data and the plurality of pedal acceleration data;
analyzing the plurality of sample average differences based on a predetermined check algorithm to distinguish the plurality of pedal acceleration data and obtain a derived resultant value; and
performing a data comparison between the derived resultant value and a predetermined threshold value to generate a comparison result.

11. The alert method according to claim 10, wherein the data comparison compares a magnitude of the derived resultant value with that of the predetermined threshold value.

12. The alert method according to claim 10, further comprising a step of generating one of an alert signal and a control signal according to the comparison result.

13. The alert method according to claim 12, further comprising a step of switching the alert method to operate in one of an operating mode and a power-saving mode in response to the control signal when the control signal is generated.

14. The alert method according to claim 10, further comprising a step of sending the plurality of acceleration data according to a predetermined transmission frequency, wherein the motion is sensed to generate the plurality of acceleration data according to a predetermined sampling frequency.

15. The alert method according to claim 10, wherein:
a first signal formed by the first plurality of sample averages and a second signal formed by the second plurality of sample averages respectively have a first frequency range and a second frequency range; and
a third signal formed by the plurality of sample average differences has a selected frequency range.

16. The alert method according to claim 10, wherein the predetermined check algorithm has one of a count algorithm and an area algorithm.

17. An alert method for a moving device having a motion, the alert method comprising steps of:
providing a moving average algorithm;
generating a plurality of motion data having a first plurality of data contents and a second plurality of data contents in response to the motion;
selecting a first predetermined data frame and a second predetermined data frame respectively associated with the first and the second plurality of data contents;
based on the first and the second predetermined data frames and the moving average algorithm, selecting a first plurality of motion data samples and a second plurality of motion data samples respectively corresponding to the first and the second predetermined data frames from the plurality of motion data to calculate a first plurality of sample averages associated with a plurality of deceleration data, a plurality of pedal acceleration data, a plurality of acceleration errors and a second plurality of sample averages associated with the plurality of acceleration errors, so as to eliminate the plurality of acceleration errors and reveal the plurality of deceleration data and the plurality of pedal acceleration data; and
analyzing a plurality of sample average differences between the first and the second pluralities of sample averages to distinguish the plurality of pedal acceleration data and obtain an analysis result.

18. The alert method according to claim 17, wherein:
the plurality of sample average differences is analyzed based on a predetermined check algorithm to obtain the analysis result, wherein the analysis result is a derived resultant value; and
the alert method further comprising a step of: performing a data comparison between the analysis result and a predetermined threshold value to generate a comparison result.

19. The alert method according to claim 17, wherein:
the plurality of motion data are those selected from a group consisting of a plurality of acceleration data, a plurality of speed data, a plurality of displacement data, and a combination thereof; and
the first and the second plurality of data contents are configured to respectively represent a first acceleration having a first frequency, and a second acceleration having a second frequency.

20. The alert method according to claim 17, wherein the first and the second predetermined data frames are respectively characterized by a first predetermined sample size and a second predetermined sample size.

* * * * *